(12) United States Patent
Haga et al.

(10) Patent No.: US 12,476,243 B2
(45) Date of Patent: Nov. 18, 2025

(54) ROLL PRESS APPARATUS FOR MANUFACTURING COMPRESSED STRIP-SHAPED ELECTRODE PLATES

(71) Applicants: PRIME PLANET ENERGY & SOLUTIONS, INC., Tokyo (JP); TOYOTA JIDOSHA KABUSHIKI KAISHA, Aichi-ken (JP); ONO ROLL CO., LTD., Hitachiomiya (JP)

(72) Inventors: Kengo Haga, Nagoya (JP); Tomofumi Hirukawa, Nisshin (JP); Kota Nakamura, Himeji (JP); Tomoya Suzuki, Seto (JP); Hideji Naito, Tajimi (JP); Yoshihide Enomoto, Nagakute (JP); Shigeru Mori, Hitachi (JP); Katsuhiko Yanai, Hitachiomiya (JP)

(73) Assignees: PRIME PLANET ENERGY & SOLUTIONS, INC., Tokyo (JP); TOYOTA JIDOSHA KABUSHIKI KAISHA, Toyota (JP); ONO ROLL CO., LTD., Hitachiomiya (JP)

( * ) Notice: Subject to any disclaimer, the term of this patent is extended or adjusted under 35 U.S.C. 154(b) by 549 days.

(21) Appl. No.: 17/682,369

(22) Filed: Feb. 28, 2022

(65) Prior Publication Data

US 2022/0293911 A1   Sep. 15, 2022

(30) Foreign Application Priority Data

Mar. 12, 2021   (JP) .................. 2021-040504

(51) Int. Cl.
*H01M 4/139*   (2010.01)
*B30B 3/00*   (2006.01)
(Continued)

(52) U.S. Cl.
CPC ............ *H01M 4/139* (2013.01); *B30B 3/005* (2013.01); *B30B 3/04* (2013.01); *H01M 4/043* (2013.01)

(58) Field of Classification Search
CPC .... H01M 4/139; H01M 4/043; H01M 4/0435; B30B 3/005; B30B 3/04; Y02E 60/10
See application file for complete search history.

(56) References Cited

U.S. PATENT DOCUMENTS 5,133,922 A * 7/1992 Kaeufer .................. B29C 55/18
264/291
9,419,269 B2 * 8/2016 Uematsu ................. B30B 3/005
(Continued)

FOREIGN PATENT DOCUMENTS

CN   102017239 A   4/2011
CN   107646150 A   1/2018
(Continued)

*Primary Examiner* — Jeffrey T Carley
*Assistant Examiner* — Jose K Abraham
(74) *Attorney, Agent, or Firm* — Finnegan, Henderson, Farabow, Garrett and Dunner LLP

(57) ABSTRACT

A roll press apparatus forms a compressed strip-shaped electrode plate by roll-pressing a strip-shaped electrode plate including an active material portion and an active material absent portion and including a tensile-force-ratio adjustment mechanism adjusting a tensile force ratio of an upstream active material absent portion tensile force applied to an upstream side and a downstream active material absent portion tensile force applied to a downstream side of an inter-roll active material absent portion held in a non-compressed state between a pair of press rolls in an active material absent portion of the strip-shaped electrode plate.

6 Claims, 17 Drawing Sheets

(51) Int. Cl.
  *B30B 3/04* (2006.01)
  *H01M 4/04* (2006.01)

(56) References Cited

U.S. PATENT DOCUMENTS

| | | | |
|---|---|---|---|
| 11,094,920 B2* | 8/2021 | Hirukawa | H01M 4/139 |
| 11,367,864 B2* | 6/2022 | Duong | B32B 37/0053 |
| 11,757,093 B2* | 9/2023 | Shin | H01G 11/86 |
| | | | 429/232 |
| 2005/0031961 A1* | 2/2005 | Tsunekawa | H01M 4/043 |
| | | | 29/623.5 |
| 2010/0330267 A1* | 12/2010 | Shimizu | H01M 4/0409 |
| | | | 427/77 |
| 2011/0033737 A1 | 2/2011 | Miyahisa et al. | |
| 2011/0262814 A1* | 10/2011 | Ikemoto | C08J 5/18 |
| | | | 429/249 |
| 2012/0045689 A1* | 2/2012 | Okabe | H01M 4/0435 |
| | | | 427/58 |
| 2013/0048340 A1* | 2/2013 | Bando | H01M 4/133 |
| | | | 174/126.2 |
| 2013/0074711 A1* | 3/2013 | Uematsu | B30B 3/005 |
| | | | 100/70 R |
| 2013/0326865 A1* | 12/2013 | Kobayashi | H01M 4/0433 |
| | | | 29/623.1 |
| 2018/0226630 A1* | 8/2018 | Yanai | B30B 3/00 |
| 2020/0194772 A1 | 6/2020 | Yanai et al. | |
| 2022/0293901 A1 | 9/2022 | Haga et al. | |
| 2022/0293911 A1* | 9/2022 | Haga | H01M 4/0435 |

FOREIGN PATENT DOCUMENTS

| | | | |
|---|---|---|---|
| CN | 109414747 A | | 3/2019 |
| EP | 3 446 806 A1 | | 2/2019 |
| JP | 2008-226502 A | | 9/2008 |
| JP | 2013-069637 A | | 4/2013 |
| JP | 2014-042923 A | | 3/2014 |
| JP | 2014-107166 A | | 6/2014 |
| JP | 2014-220113 A | | 11/2014 |
| JP | 2017-228349 A | | 12/2017 |
| JP | 2018063860 A | * | 4/2018 |
| JP | 6798236 B2 | * | 12/2020 |
| JP | 2022-139918 A | | 9/2022 |
| KR | 2013-0033318 A | | 4/2013 |

* cited by examiner

ROLL PRESS APPARATUS FOR MANUFACTURING COMPRESSED STRIP-SHAPED ELECTRODE PLATES

CROSS-REFERENCE TO RELATED APPLICATIONS

This application is based upon and claims the benefit of priority from the prior Japanese Patent Application No. 2021-040504 filed on Mar. 12, 2021, the entire contents of which are incorporated herein by reference.

BACKGROUND

Technical Field

The present disclosure relates to a roll press apparatus for forming a compressed strip-shaped electrode plate by roll-pressing a strip-shaped electrode plate and a manufacturing method for a compressed strip-shaped electrode plate which is manufactured by roll-pressing a strip-shaped electrode plate.

Related Art

As an electrode plate used for a lithium-ion secondary cell, there has been known a compressed strip-shaped electrode plate formed of a compressed active material layer which has been pressed in its thickness direction and compressed on a strip-shaped current collecting foil. Further, among electrode plates having the above-mentioned configuration, as shown in FIG. 17, there is a compressed strip-shaped electrode plate 901 configured such that a center portion in a width direction FH constitutes a strip-shaped post-pressed active material portion 911 including compressed active material layers 905 and 906 in a thickness direction GH and both side portions in the width direction FH constitute strip-shaped post-pressed active material absent portions 912 having no compressed active material layers 905 and 906 in the thickness direction GH, respectively.

This compressed strip-shaped electrode plate 901 is manufactured by the following method, for example. Specifically, a center portion in the width direction FH of the strip-shaped current collecting foil 3 is firstly formed by strip-shaped undried active material layers 905X and 906X, and subsequently, the undried active material layers 905X and 906X are heated and dried to form strip-shaped active material layers 905Z and 906Z. Then, this strip-shaped electrode plate 901Z is conveyed in a longitudinal direction EH and roll-pressed to compact the active material layers 905Z and 906Z in the thickness direction GH so that the compressed active material layers 905 and 906 are formed. In this manner, the compressed strip-shaped electrode plate 901 is manufactured. As an example of a conventional technique, JP 2017-228349A1 can be given.

SUMMARY

Technical Problems

However, when the above-mentioned strip-shaped electrode plate 901 is to be roll-pressed, in the active material absent portions 912Z, there might be repeatedly generated oblique wrinkles SW extending obliquely from an inside to an outside of the width direction FH and from an upstream side EUH to a downstream side EDH, especially around a boundary with the active material portion 911Z.

The present disclosure has been made in view of the above circumstances and has a purpose of providing a roll press apparatus that can roll-press a strip-shaped electrode plate with adjusting a balance of a tensile force applied to active material absent portions of the strip-shaped electrode plate and a manufacturing method for a compressed strip-shaped electrode plate that can restrain generation of wrinkles on the active material absent portions by adjusting the balance of the tensile force applied to the active material absent portions of the strip-shaped electrode plate.

Means of Solving the Problems

One aspect of the present disclosure for solving the above problem is a roll press apparatus configured to form a compressed strip-shaped electrode plate formed with a compressed active material layer, which is formed in a manner that a strip-shaped electrode plate is conveyed in a longitudinal direction to be roll-pressed so that a active material layer is compressed, the strip-shaped electrode plate comprising: an active material portion including a strip-shaped current colleting foil and the active material layer of a strip shape extending over the current collecting foil in the longitudinal direction of the current collecting foil, the active material portion of a strip shape extending in the longitudinal direction and including the active material layer in a thickness direction of the current collecting foil, and an active material absent portion of a strip shape extending in the longitudinal direction and being arranged with the active material portion in a width direction of the current collecting foil, the active material absent portion having no active material layer in the thickness direction and having a thinner thickness than the active material portion, wherein the roll press apparatus includes: a pair of press rolls placed in parallel with a roll gap formed therebetween; and a tensile-force-ratio adjustment mechanism configured to adjust a tensile force ratio of an upstream active material absent portion tensile force and a downstream active material absent portion tensile force in an inter-roll active material absent portion held with no compression by the pair of press rolls of the active material absent portion of the strip-shaped electrode plate.

The present inventors have diligently studied and concluded that, when roll-pressing a strip-shaped electrode plate, an active material absent portion (a post-pressed active material absent portion) tends to cause wrinkles or hardly cause wrinkles depending on a value of a tensile force ratio $\tau d/\tau u$ of an upstream active material absent portion tensile force $\tau u$ and a downstream active material absent portion tensile force $\tau d$ which are applied to inter-roll active material absent portions of the active material absent portion held between a pair of press rolls in an uncompressed manner. From this reason, when roll-pressing by a conventional roll press apparatus, in most cases, an upstream entire tensile force Tu applied to an upstream side of the entire strip-shaped electrode plate before pressing and a downstream entire tensile force Td applied to a downstream side of the entire compressed strip-shaped electrode plate after pressing are set to be equal (Tu=Td).

In the above case, the upstream entire tensile force Tu applied to the strip-shaped electrode plate before roll-pressing is applied entirely and almost equally over the width direction, and thus the upstream active material absent portion tensile force $\tau u$ applied to the inter-roll active material absent portion of the active material absent portion is small. On the other hand, in the compressed strip-shaped electrode plate after roll-pressing, while the post-pressed active material portion has been extended in a longitudinal direction by pressing, the post-pressed active material absent portion has been hardly extended. Accordingly, most of the downstream entire tensile force Td applied to the compressed strip-shaped electrode plate is not applied to the post-pressed active material portion but only applied to the post-pressed active material absent portion, so that the downstream active material absent portion tensile force τd applied to the inter-roll active material absent portion becomes larger than the upstream active material absent portion tensile force τu (τd>τu). This causes imbalance between the upstream active material absent portion tensile force τu and the downstream active material absent portion tensile force τd which are applied to the inter-roll active material absent portion of the active material absent portion, thereby increasing a tensile force ratio τd/τu. It has been confirmed that the above-mentioned wrinkles SW (see FIG. 17) are easily generated when this tensile force ratio τd/τu becomes too large.

To address this problem, the above-mentioned roll press apparatus is provided with the above-mentioned tensile-force-ratio adjustment mechanism. Thus, when roll-pressing the strip-shaped electrode plate, the strip-shaped electrode plate can be roll-pressed to manufacture the compressed strip-shaped electrode plate with adjusting the balance of the tensile force applied to the inter-roll active material absent portion of the active material absent portion, specifically, with adjusting the tensile force ratio τd/τu of the upstream active material absent portion tensile force τu and the downstream active material absent portion tensile force τd which are applied to the inter-roll active material absent portion.

Herein, as a "strip-shaped electrode plate," there is a strip-shaped electrode plate configured such that a strip-shaped active material portion is placed in a center of a width direction and strip-shaped active material absent portions are arranged on both sides in the width direction of this active material portion as mentioned above, for example. Alternatively, there is another example of a strip-shaped electrode plate configured such that a plurality of strip-shaped active material portions and a plurality of strip-shaped active material absent portions are alternately arranged in the width direction.

Further, as the "active material absent portion," other than an active material absent portion formed only of a current collecting foil, there is an active material absent portion formed on a current collecting foil with a protective layer having a thickness thinner than the active material layer as one example.

Further, the above-mentioned roll press apparatus is provided with the tensile-force-ratio adjustment mechanism to adjust the tensile force ratio τd/τu, and an applicable range of this apparatus is not limited to a case that the upstream entire tensile force Tu and the downstream entire tensile force Td are equal (Tu=Td).

Further, in the above-mentioned roll press apparatus, preferably, the tensile-force-ratio adjustment mechanism includes a first upstream-direction tensile roll configured to push a pre-press active material absent portion before roll-pressing of the active material absent portion of the strip-shaped electrode plate against any one of the pair of press rolls and pull the pre-press active material absent portion toward an upstream side to increase the upstream active material absent portion tensile force that is applied to the inter-roll active material absent portion.

The above-mentioned roll press apparatus includes the above-mentioned upstream-direction tensile roll, and thus the upstream active material absent portion tensile force τu that is applied to the inter-roll active material absent portion of the active material absent portion can be increased. Accordingly, it is possible to make the tensile force ratio τd/τu small and relax the imbalanced state between the tensile forces τu and τd with a simple configuration of only providing the upstream-direction tensile roll.

Further, in the roll press apparatus described in any one mentioned above, preferably, the tensile-force-ratio adjustment mechanism includes a second upstream-direction tensile roll configured to push the post-pressed active material portion of the compressed strip-shaped electrode plate after roll-pressing against any one of the pair of press rolls and pull the post-pressed active material portion toward the upstream side to reduce the downstream active material absent portion tensile force that is applied to the inter-roll active material absent portion.

The above-mentioned roll press apparatus includes the above-mentioned upstream-direction tensile roll, so that the downstream active material absent portion tensile force τd that is applied to the inter-roll active material absent portion of the active material absent portion can be reduced. Thus, it is possible to make the tensile force ratio τd/τu small and to relax the imbalanced state between the tensile forces τu and τd with the simple configuration of only providing the upstream-direction tensile roll.

Further, in the roll press apparatus described in any one of the above, preferably, the tensile-force-ratio adjustment mechanism includes a downstream-direction tensile roll configured to push the post-pressed active material portion of the compressed strip-shaped electrode plate after roll-pressing against any one of the pair of press rolls and pull the post-pressed active material portion toward a downstream side to reduce the downstream active material absent portion tensile force that is applied to the inter-roll active material absent portion.

The above-mentioned roll press apparatus includes the above-mentioned downstream-direction tensile roll, so that the downstream active material absent portion tensile force τd that is applied to the inter-roll active material absent portion of the active material absent portion can be reduced. Accordingly, it is possible to make the tensile force ratio τd/τu small and relax the imbalanced state between the tensile forces τu and τd with the simple configuration of only providing the downstream-direction tensile roll.

Further, another aspect of the present disclosure is a manufacturing method for a compressed strip-shaped electrode plate comprising a strip-shaped current collecting foil and a compressed active material layer which has been compressed in a thickness direction of the current collecting foil, the method including: electrode plate forming of forming a strip-shaped electrode plate, the strip-shaped electrode plate including: an active material portion of a strip shape extending in a longitudinal direction and having an active material layer in a thickness direction, the active material portion including the current collecting foil and the active material layer of a strip shape extending over the current collecting foil in the longitudinal direction of the current collecting foil; and an active material absent portion of a strip shape extending in the longitudinal direction and being arranged in the width direction of the active material portion and the current collecting foil, the active material absent portion having no active material layer in the thickness direction and having a thinner thickness than the active material portion, and pressing of conveying the strip-shaped electrode plate in the longitudinal direction and roll-pressing the strip-shaped electrode plate by a pair of press rolls arranged in parallel with a roll gap formed therebetween to form the compressed strip-shaped electrode plate provided with the compressed active material layer, wherein the pressing is performed with adjusting a tensile force ratio of an upstream active material absent portion tensile force applied to an upstream side and a downstream active material absent portion tensile force applied to a downstream side of an inter-roll active material absent portion which is not compressed but held between the pair of press rolls so that generation of wrinkles in the active material absent portion is restrained.

The above-mentioned manufacturing method for the compressed strip-shaped electrode plate includes the above-mentioned pressing. Accordingly, the compressed strip-shaped electrode plate can be manufactured with restraining generation of the wrinkles in the active material absent portion (post-pressed active material absent portion) by adjusting the balance of the tensile force applied to the inter-roll active material absent portion among the active material absent portion of the strip-shaped electrode plate, specifically, by adjusting the tensile force ratio τd/τu of the upstream active material absent portion tensile force τu and the downstream active material absent portion tensile force τd which are applied to the inter-roll active material absent portion.

Further, in the above-mentioned manufacturing method of the compressed strip-shaped electrode plate, preferably, the tensile force ratio is set to be 2.0 or less.

In the above-mentioned manufacturing method of the compressed strip-shaped electrode plate, the pressing is performed with setting the tensile force ratio τd/τu as τd/τu≤2.0. Accordingly, when the strip-shaped electrode plate is to be roll-pressed, generation of wrinkles in the active material absent portion (pressed active material absent portion) can be appropriately restrained.

Further, in the above-mentioned manufacturing method of the compressed strip-shaped electrode plate, preferably, the tensile force ratio is set to be 0.3 or more.

In the above-mentioned manufacturing method of the compressed strip-shaped electrode plate, the pressing is performed with setting the tensile force ratio τd/τu as τd/τu≥0.3. Accordingly, the downstream active material absent portion tensile force τd is made large to some extent and the tensile force ratio is set as τd/τu≥0.3, thereby improving productivity of the compressed strip-shaped electrode plate.

DETAILED DESCRIPTION OF THE EXEMPLARY EMBODIMENTS

First Embodiment

Figure 1:
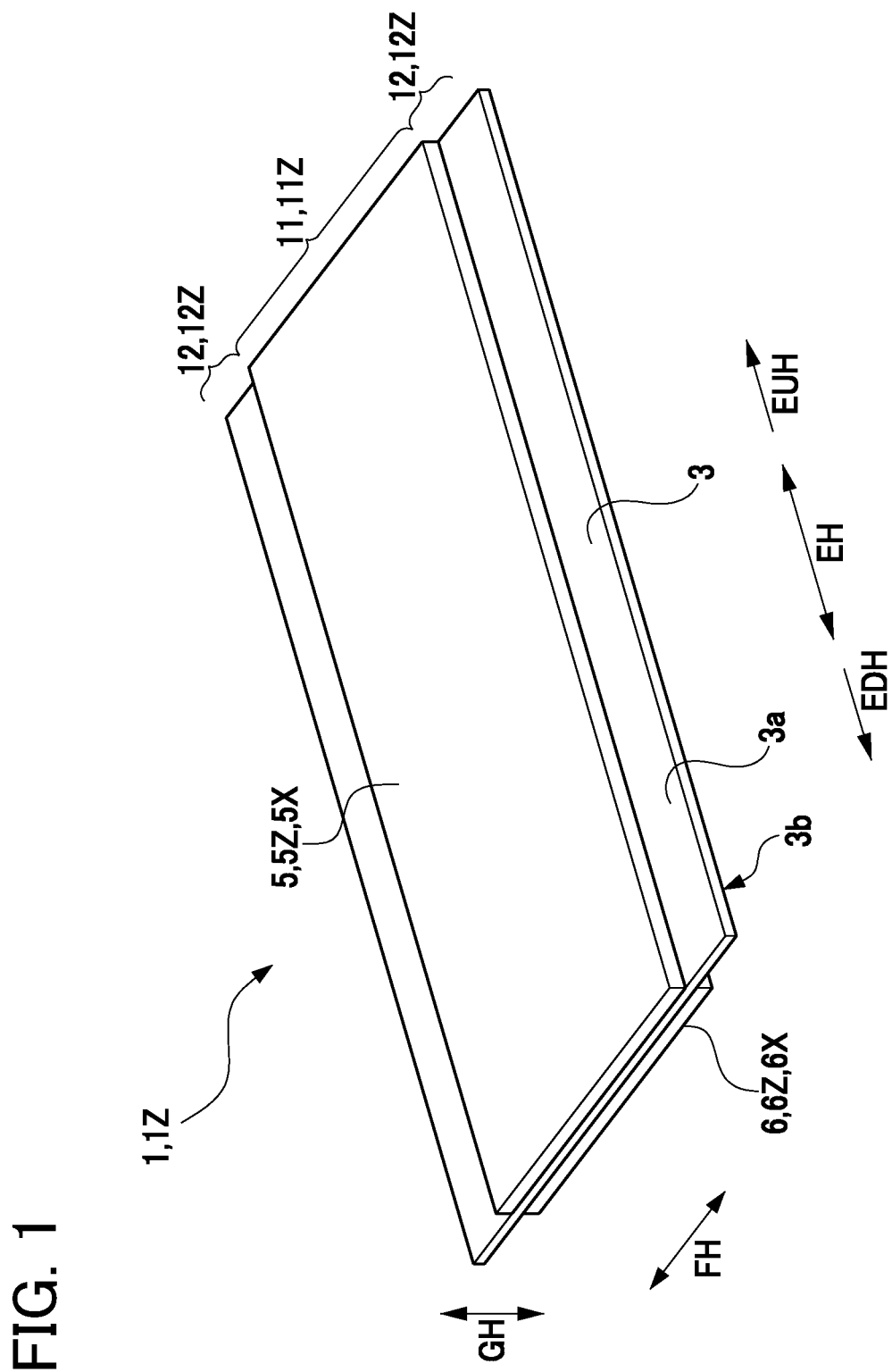
FIG. 1 is a perspective view of a compressed strip-shaped electrode plate in first to fifth embodiments.
Figure 2:
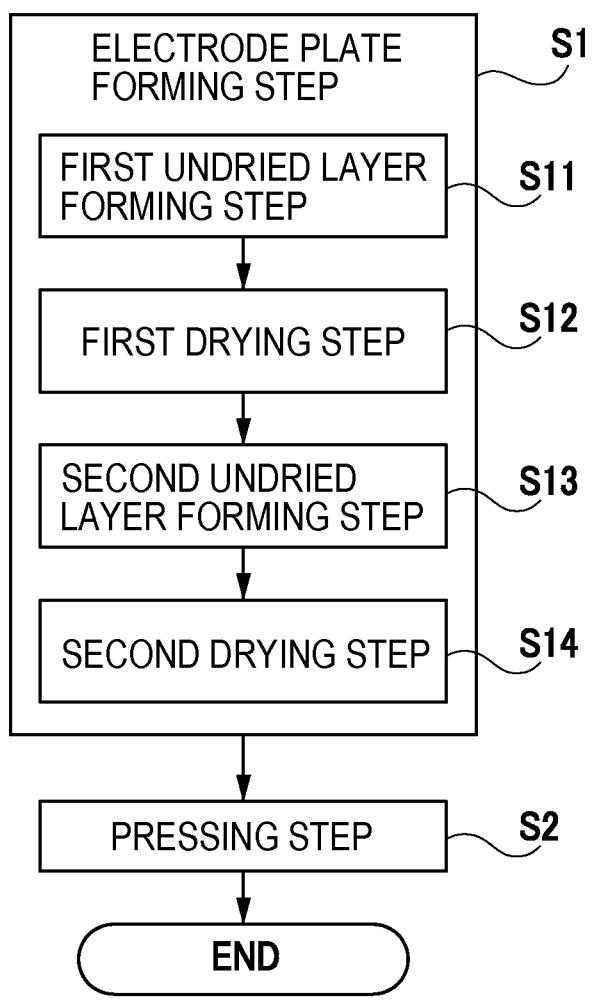
FIG. 2 is a flowchart of a manufacturing method for the compressed strip-shaped electrode plate in the first to fifth embodiments.
Figure 3:
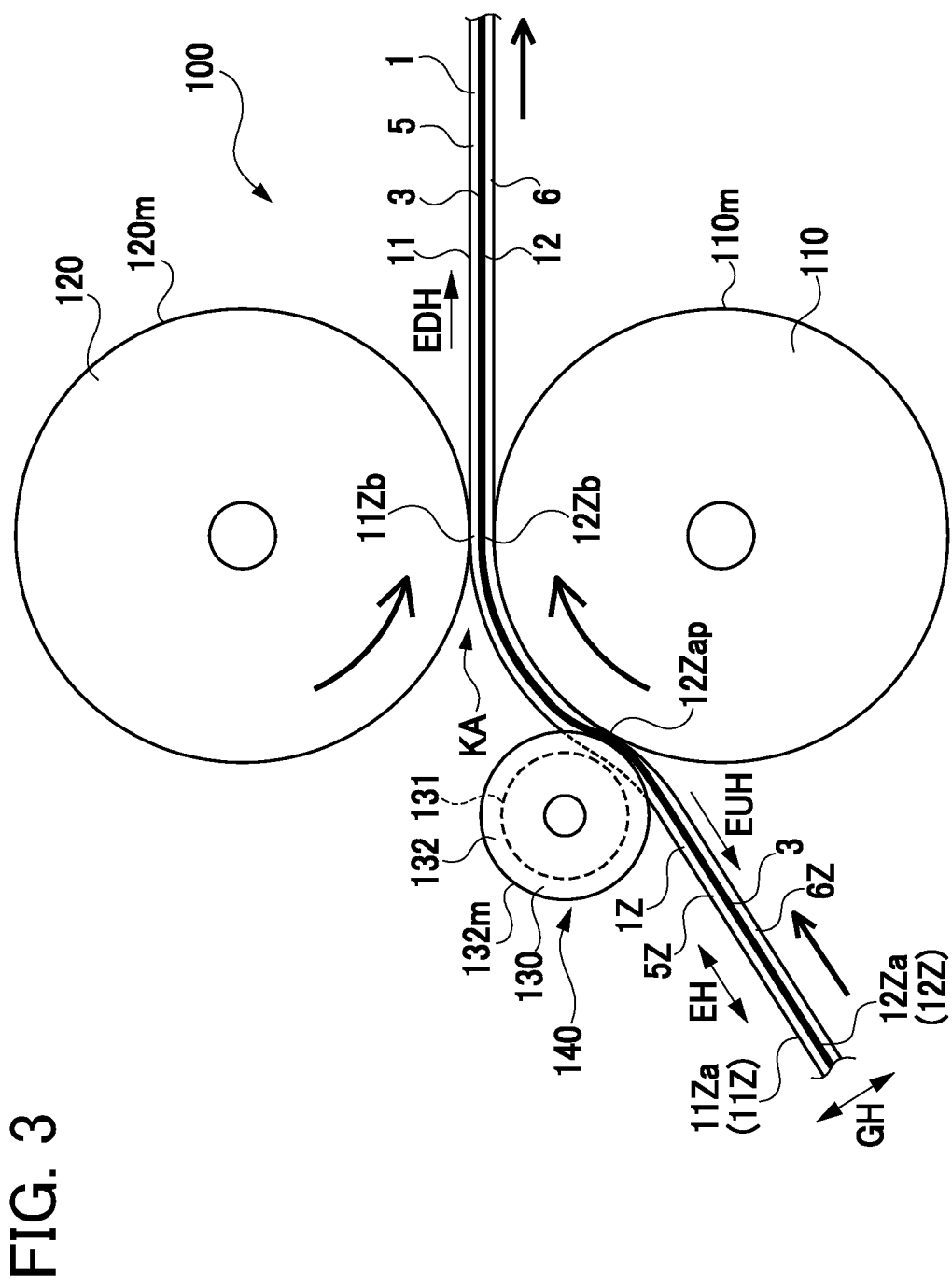
FIG. 3 is an explanatory sideways view of a strip-shaped electrode plate, the compressed strip-shaped electrode plate, and a roll press apparatus in the first embodiment.
Figure 4:
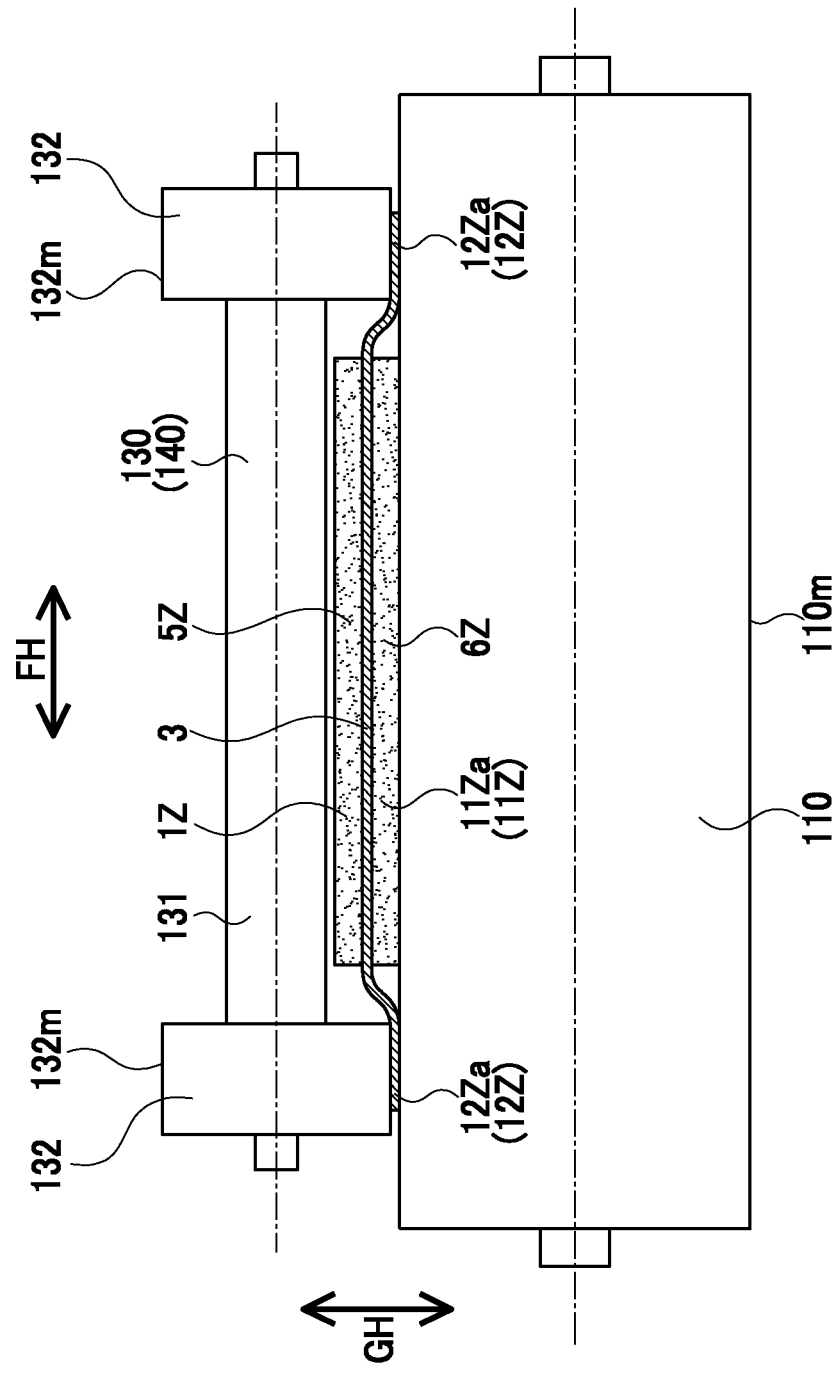
FIG. 4 is an explanatory view of the strip-shaped electrode plate, a first press roll, and an upstream-direction tensile roll in the first embodiment when they are seen from an upstream side.

A first embodiment of the present disclosure is explained below with reference to the accompanying drawings. FIG. 1 is a perspective view of a compressed strip-shaped electrode plate 1 according to the first embodiment. This compressed strip-shaped electrode plate 1 is used for manufacturing a rectangular parallel-piped hermetically sealed lithium-ion secondary battery to be mounted on a vehicle and the like such as a hybrid vehicle, a plug-in hybrid vehicle, and an electric vehicle. To be specific, the compressed strip-shaped electrode plate 1 is a strip-shaped positive electrode plate used for manufacturing a flat-wound shaped or laminated electrode body configuring a battery. In the following explanation, a longitudinal direction EH, a width direction FH, and a thickness direction GH of the compressed strip-shaped electrode plate 1 are defined as the ones indicated in FIG. 1.

The compressed strip-shaped electrode plate 1 includes a current collecting foil 3 made of a strip-shaped aluminum foil extending in the longitudinal direction EH with a thickness of about 13 μm. This current collecting foil 3 has a first main surface 3a, and on a center portion of the width direction FH extending in the longitudinal direction EH of this first main surface 3a, a first compressed active material layer 5 (hereinafter, also simply referred as the "compressed active material layer 5") with a thickness of about 60 μm which has been pressed and compressed in the thickness direction GH is formed in a strip-like shape in the longitudinal direction EH. Further, on a second main surface 3b on an opposite side, a second compressed active material layer 6 (hereinafter, also simply referred as the "compressed active material layer 6") with a thickness of about 60 μm which has been pressed and compressed in the thickness direction GH is formed in a strip-like shape in the longitudinal direction EH on a center portion of the width direction FH extending in the longitudinal direction EH of the second main surface 3b. On the other hand, portions on both sides in the width direction FH extending in the longitudinal direction EH of the current collecting foil 3 are not provided with the compressed active material layers 5 and 6, respectively, and the current collecting foil 3 is exposed in the thickness direction GH.

The compressed active material layers 5 and 6 are each configured with active material particles, conductive particles, and binders. In the present first embodiment, the active material particles are lithium-transition metal composite oxide, more specifically, lithium nickel-manganese-cobalt-oxide particles. Further, the conductive particles are acetylene black (AB) particles, and the binders are polyvinylidene fluoride (PVDF).

This compressed strip-shaped electrode plate 1 is, as mentioned above, formed with the current collecting foil 3, the strip-shaped compressed active material layers 5 and 6 formed on this current collecting foil 3. In the compressed strip-shaped electrode plate 1, a center portion in the width direction FH is a strip-shaped post-pressed active material portion 11 having the compressed active material layers 5 and 6 in the thickness direction GH. On the other hand, in the compressed strip-shaped electrode plate 1, the both side portions in the width direction FH (portions arranged on both sides in the width direction FH of the post-pressed active material portion 11) are not provided with the compressed active material layers 5 and 6 in the thickness direction GH, and each of the both sides constitutes a post-pressed active material absent portion 12 having a thinner thickness than the post-pressed active material portion 11.

A manufacturing method for the compressed strip-shaped electrode plate 1 is now explained (see FIG. 2 to FIG. 5). Firstly, in an "electrode plate forming step S1" (see FIG. 2), a strip-shaped electrode plate 1Z before being pressed is formed. The electrode plate forming step S1 includes a "first undried layer forming step S11," a "first drying step S12," a "second undried layer forming step S13," and a "second drying step S14" in this order.

In the first undried layer forming step S11, a strip-shaped first undried active material layer 5X is formed on the first main surface 3a of the current collecting foil 3. Specifically, the active material particles (lithium nickel-manganese-cobalt-oxide particles in the present first embodiment), the conductive particles (the AB particles in the present first embodiment), the binders (PVDF in the present first embodiment), and a disperse medium (N-Methyl-pyrrolidone (NMP) in the present first embodiment) are mixed to obtain an active material paste in advance. In this first undried layer forming step S11, the current collecting foil 3 is conveyed in the longitudinal direction EH and the active material paste is discharged to the center portion in the width direction FH of the first main surface 3a of the current collecting foil 3 by an application die (not shown), so that the strip-shaped first undried active material layer 5X is serially formed on the first main surface 3a of the current collecting foil 3.

Subsequently, in the first drying step S12, the strip-shaped electrode plate obtained in the first undried layer forming step S11 is conveyed into a drying device (not shown) to heat and dry the first undried active material layer 5X by blowing hot air, so that a first active material layer 5Z before being pressed (hereinafter, simply referred as an "active material layer 5Z") is formed.

Subsequently, in the second undried layer forming step S13, as similar to the first undried layer forming step S11, the center portion of the width direction FH of the second main surface 3b on an opposite side of the current collecting foil 3 is also formed with a strip-shaped second undried active material layer 6X.

Subsequently, in the second drying step S14, as similar to the first drying step S12, the second undried active material layer 6X of the strip-shaped electrode plate obtained in the second undried layer forming step S13 is heated and dried by blowing hot air, so that a second active material layer 6Z before being pressed (hereinafter, simply referred as an "active material layer 6Z") is formed. Thereafter, this strip-shaped electrode plate 1Z is wound into a roll-like shape by use of a winding device (not shown).

This strip-shaped electrode plate 1Z is formed with the current collecting foil 3 and the active material layers 5Z and 6Z. In the strip-shaped electrode plate 1Z, the center portion in the width direction FH is the strip-shaped active material portion 11Z, which is before being pressed, having the active material layers 5Z and 6Z in the thickness direction GH, and the both side portions arranged on both sides in the width direction FH of the active material portion 11Z are the strip-shaped active material absent portions 12Z, which has not yet been pressed, having no active material layers 5Z and 6Z formed in the thickness direction GH, respectively.

Subsequently, in the "pressing step S2" (see FIG. 2), the strip-shaped electrode plate 1Z formed in the electrode plate forming step S1 is conveyed in the longitudinal direction EH and roll-pressed by use of a roll press apparatus 100 (see FIG. 3 and FIG. 4) to compact each of the active material layers 5Z and 6Z in the thickness direction GH, so that the compressed strip-shaped electrode plate 1 provided with the compressed active material layers 5 and 6 are formed (see also FIG. 5).

Herein, the roll press apparatus 100 is explained. The roll press apparatus 100 is provided with a first press roll 110 and a second press roll 120 which are arranged in parallel with having a roll gap KA. The roll press apparatus 100 further includes a tensile-force-ratio adjustment mechanism 140 provided on an upstream side EUH (a left side in FIG. 3) of the roll gap KA of the first press roll 110 and the second press roll 120, and this tensile-force-ratio adjustment mechanism 140 includes an upstream-direction tensile roll 130 placed near the roll gap KA.

Further, the roll press apparatus 100 is provided with a wind-off device (not shown) to wind off the strip-shaped electrode plate 1Z, which is before being pressed and hereinafter referred as the pre-press strip-shaped electrode plate 1Z, that has been wound into a roll-like shape and to convey the strip-shaped electrode plate 1Z in the longitudinal direction EH and a wind-up device (not shown) to wind the compressed strip-shaped electrode plate 1 which has been pressed into a roll-like shape. The roll press apparatus 100 is further provided with an upstream-side tensile force applying unit (not shown) between the unwinding device (not shown) and the upstream-direction tensile roll 130 to apply an upstream entire tensile force Tu (in the present first embodiment, Tu=30.0 N) toward the upstream side EUH over the entire width direction FH to apply the force to the strip-shaped electrode plate 1Z during conveyance. Furthermore, the roll press apparatus 100 is provided with a downstream-side tensile force applying unit (not shown) to apply a downstream entire tensile force Td (in the present first embodiment, as equal to Tu, Td=Tu=30.0 N) toward a downstream side EDH over the entire width direction FH to apply the force to the compressed strip-shaped electrode plate 1 during conveyance between the roll gap KA of the first press roll 110 and the second press roll 120 and the winding device (not shown).

The first press roll 110 and the second press roll 120 are each formed with a roll surface 110m and a roll surface 120m both of which are made of stainless steel. The first press roll 110 and the second press roll 120 are each coupled with a motor (not shown), the first press roll 110 is rotatable in a clockwise direction in FIG. 3, and the second press roll 120 is rotatable in a counter-clockwise direction in FIG. 3. In the present first embodiment, the strip-shaped electrode plate 1Z that has been wound off from the winding device (not shown) is to be conveyed in the longitudinal direction EH in a manner that the first active material layer 5Z faces upward in FIG. 3 and FIG. 4 and the second active material layer 6Z faces downward in FIG. 3 and FIG. 4. Accordingly, in FIG. 3, the second press roll 120 placed upward comes to contact with the first active material layer 5Z of the strip-shaped electrode plate 1Z, and the first press roll 110 placed downward in FIG. 3 comes to contact with the second active material layer 6Z of the strip-shaped electrode plate 1Z.

Figure 5:
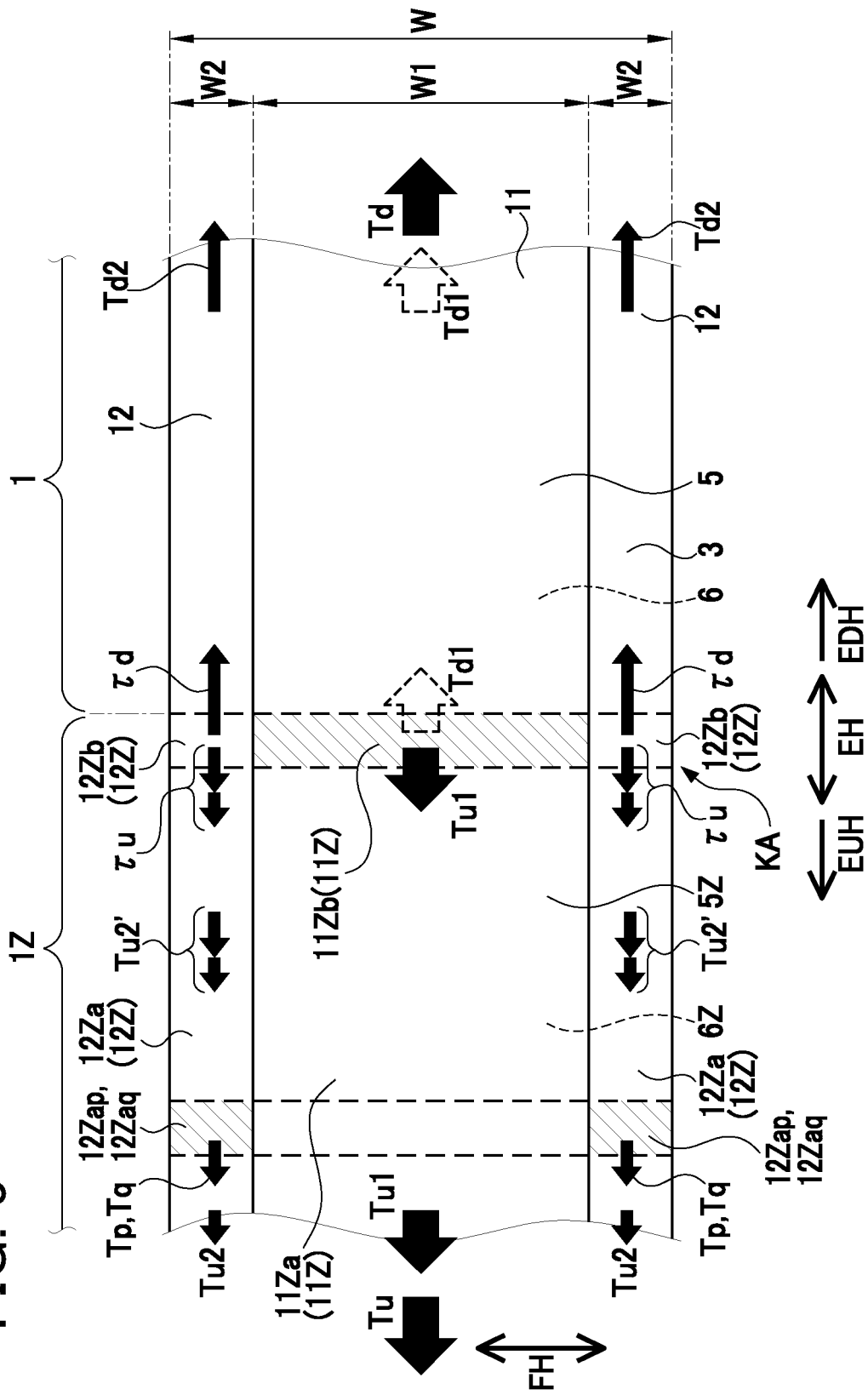
FIG. 5 is an explanatory view for explaining a tensile force applied to the strip-shaped electrode plate and the compressed strip-shaped electrode prate before and after roll-pressing in the first and second embodiments.

Herein, explanation of the active material portion 11Z of the strip-shaped electrode plate 1Z is made separately with explanation about a portion held tightly between the first press roll 110 and the second press roll 120 in the roll gap KA (the inter-roll active material portion 11Zb corresponding to an obliquely hatched part in FIG. 5) and explanation about a portion on an upstream side EUH of the inter-roll active material portion 11Zb, i.e., a portion prior to roll-pressing (a pre-press active material portion 11Za) (see FIG. 5). Further, explanation about the active material absent portions 12Z of the strip-shaped electrode plate 1Z is made separately with explanation about a portion which is held between the first press roll 110 and the second press roll 120 but not compressed (the inter-roll active material absent portions 12Zb) and explanation about a portion on the upstream side EUH of the inter-roll active material absent portions 12Zb, i.e., portions prior to roll-pressing (pre-press active material absent portions 12Za).

The tensile-force-ratio adjustment mechanism 140 adjusts the tensile force ratio τd/τu of an upstream active material absent portion tensile force τu applied to the upstream side EUH and a downstream active material absent portion tensile force τd applied to the downstream side EDH in the above-mentioned inter-roll active material absent portions 12Zb. The tensile-force-ratio adjustment mechanism 140 of the present first embodiment specifically includes the upstream-direction tensile roll 130 as mentioned above, and the active material absent portion 12Z is pressed against the first press roll 110 by the upstream-direction tensile roll 130 so that the upstream active material absent portion tensile force τu applied to the inter-roll active material absent portions 12Zb can be increased.

To be more specific, the upstream-direction tensile roll 130 is an elastic roll provided with a roll center portion 131 placed in a center in the width direction FH and roll both-side portions 132 placed on both sides of the roll center portion 131 in the width direction FH and each formed with a roll surface 132m which has a larger diameter than the roll center portion 131 and is made of rubber to be elastically deformed. The upstream-direction tensile roll 130 is also a follower roll to rotate in association with conveyance of the strip-shaped electrode plate 1Z. In the roll 130, the roll center portion 131 having a smaller diameter than the roll both-side portions 132 is to face with the pre-press active material portion 11Za of the active material portion 11Z of the strip-shaped electrode plate 1Z with a clearance. On the other hand, the roll surfaces 132m of the roll both-side portions 132 are pressure-contacted with tensile roll pressure portions 12Zap (obliquely hatched parts in FIG. 5) of the pre-press active material absent portions 12Za of the active material absent portions 12Z in the strip-shaped electrode plate 1Z, and these tensile roll pressure portions 12Zap are each pressed against the first press roll 110.

In other words, the roll both-side portions 132 of the upstream-direction tensile roll 130 are to press the tensile roll pressure portions 12Zap (the current collecting foil 3) of the pre-press active material absent portions 12Za against the first press roll 110 to hold and press the pre-press active material absent portions 12Za between the roll both-side portions 132 and the first press roll 110. As mentioned above, the upstream-direction tensile roll 130 is an elastic roll in which the roll surfaces 132m are made of rubber and also a follower roll. Therefore, a magnitude of a rotation resistance of the upstream-direction tensile roll 130 changes according to a magnitude of a press-contact force of the upstream-direction tensile roll 130 (the roll both-side portions 132) applied to the tensile roll pressure portions 12Zap and the first press roll 110. Namely, when this rotation resistance is increased, a tensile force Tp applied in a direction of the upstream side EUH to the tensile roll pressure portions 12Zap which are press-contacted with the upstream-direction tensile roll 130 and the pre-press active material absent portions 12Za on the downstream side EDH of the tensile roll pressure portions 12Zap can be increased.

Thus, it is possible to increase the upstream active material absent portion tensile force τu applied to the inter-roll active material absent portions 12Zb. In the present first embodiment, the upstream-direction tensile roll 130 has been adjusted such that the tensile roll pressure portions 12Zap and the pre-press active material absent portions 12Za on the downstream side EDH of the tensile roll pressure portions 12Zap are each pulled toward the upstream side EUH with a tensile force of Tp=9.2 N. Accordingly, the upstream active material absent portion tensile force τu applied to the inter-roll active material absent portions 12Zb also increases by the tensile force of about Tp=9.2 N as compared with a case of not providing the upstream-direction tensile roll 130.

In the pressing step S2, the strip-shaped electrode plate 1Z which has been unwound from the unwinding device (not shown) and conveyed in the longitudinal direction EH is roll-pressed by the first press roll 110 and the second press roll 120 and the active material layers 5Z and 6Z are compressed in the thickness direction GH, so that the compressed strip-shaped electrode plates 1 each provided with the compressed active material layers 5 and 6 are serially manufactured. Thereafter, these compressed strip-shaped electrode plates 1 are wound around the winding device (not shown) into a roll-like shape.

In the present first embodiment, the pre-press strip-shaped electrode plate 1Z is subjected to an upstream entire tensile force Tu of 30.0 N in a direction of the upstream side EUH by an upstream-side tensile force applying unit (not shown). This upstream entire tensile force Tu is applied almost uniformly to the strip-shaped electrode plate 1Z over the entire width direction FH. Accordingly, the tensile force Tu2 in a direction of the upstream side EUH applied to the active material absent portions 12Z becomes a small value corresponding to a size of a width W2 of the respective active material absent portions 12Z. In the present first embodiment, a width W of the entire strip-shaped electrode plate 1Z is 216 mm, a width W1 of the active material portion 11Z is 150 mm, and a width W2 of the respective active material absent portions 12Z is 33 mm (W=W1+2×W2). Therefore, the tensile force Tu2 in the direction of the upstream side EUH applied to a pair of the active material absent portions 12Z is defined as almost Tu2=Tu×(W2/W)=30×(33/216)=4.6 N.

Further in the present first embodiment, the tensile roll pressure portions 12Zap are pressed against the first press roll 110 by the roll both-side portions 132 of the upstream-direction tensile roll 130 as mentioned above. Thus, the tensile roll pressure portions 12Zap and the pre-press active material absent portions 12Za in a downstream-side EDH range of the tensile roll pressure portions 12Zap are pulled toward the upstream side EUH by a tensile force Tu2' of the original tensile force Tu2 added with the above-mentioned tensile force Tp. As a result of this, the upstream active material absent portion tensile force τu applied to the inter-roll active material absent portions 12Zb of the active material absent portions 12Z is increased by the tensile force Tp as compared with the case of not providing the tensile-force-ratio adjustment mechanism 140. In the present first embodiment, the upstream active material absent portion tensile force τu is roughly defined as τu=Tu2+Tp=Tu2'=4.6+9.2=13.8 N.

The compressed strip-shaped electrode plate 1 which has been roll-pressed is entirely subjected to the downward entire tensile force Td in a direction of the downstream side EDH (in the present first embodiment, for example, Td=30.0 N) by a downstream-side tensile force applying unit (not shown). However, in this compressed strip-shaped electrode plate 1 which has been roll-pressed, while the post-pressed active material portion 11 is extended in the longitudinal direction EH, the post-pressed active material absent portions 12 are hardly pressed due to their thin thickness, so that the post-pressed active material absent portions 12 are hardly extended. Accordingly, the downward entire tensile force Td is hardly applied to the post-pressed active material portion 11 (the tensile force Td1 applied to the post-pressed active material portion 11≈0), but the downward entire tensile force Td is applied to the two post-pressed active material portion 12 (see FIG. 5). Therefore, the magnitude of the tensile force Td2 in a direction of the downstream side EDH applied to each of the post-pressed active material absent portions 12 is almost a half of the downward entire tensile force Td (Td2=Td/2). Further, the downward active material absent portion tensile force τd applied to the inter-roll active material absent portions 12Zb is almost equal to the tensile force Td2 in the direction of the downward side EDH applied to the post-pressed active material absent portions 12 (τd=Td2). In the present first embodiment, the downward entire tensile force Td is also set as Td=30.0 N, and thus the tensile force Td2 in the direction of the downward side EDH and the downward active material absent portion tensile force τd are each resulted in Td2=τd=15.0 N.

Therefore, providing the tensile-force-ratio adjustment mechanism 140 achieves reduction in the tensile force ratio τd/τu of the upstream active material absent portion tensile force τu and the downward active material absent portion tensile force τd which are applied to the inter-roll active material absent portions 12Zb respectively as compared with the case of not providing the tensile-force-ratio adjustment mechanism 140. In the present first embodiment, when the tensile-force-ratio adjustment mechanism 140 is not provided, the tensile force results in τd/τu=Td/Tu2=15.0/4.6=3.26. On the other hand, in the present first embodiment providing the tensile-force-ratio adjustment mechanism 140, the tensile force ratio can be adjusted as τd/τu=Td/Tu2=15.0/13.8=1.09. The tensile force ratio τd/τu can be thus made small and thereby reducing the imbalance between the tensile forces τd and τu, so that it is possible to restrain generation of wrinkles in the active material absent portions 12Z (the post-pressed active material absent portions 12) in roll-pressing.

In addition, as shown in FIG. 5, in the active material portion 11Z, the tensile force applied to the inter-roll active material portion 11Zb held between the first press roll 110 and the second press roll 120 in the roll gap KA causes the imbalance between the force in the direction of the upstream side EUH and the force in the direction of the downstream side EDH. Namely, the inter-roll active material portion 11Zb is subjected to the tensile force Tu1 in the direction of the upstream side EUH. In the present first embodiment, specifically, the tensile force of Tu1=Tu×(W1/W)=30×(150/216)=20.8 N is applied. However, the inter-roll active material portion 11Zb is hardly subjected to the tensile force Td1 in the direction of the downstream side EDH (the tensile force Td1≈0). This is because, as mentioned above, while the post-pressed active material portion 11 is extended in the longitudinal direction EH, the post-pressed active material absent portions 12 are hardly extended, so that the downward entire tensile force Td is hardly applied to the post-pressed active material portion 11.

Incidentally, there is no problem due to the imbalance in the magnitude of this tensile force Tu1 and the tensile force Td1. The inter-roll active material portion 11Zb is firmly held and pressed to be restricted by the first press roll 110 and the second press roll 120, and thus the tensile force Tu1 on the upstream side EUH and the tensile force Td1 on the downstream side EDH are not influenced each other.

Second Embodiment

Figure 6:
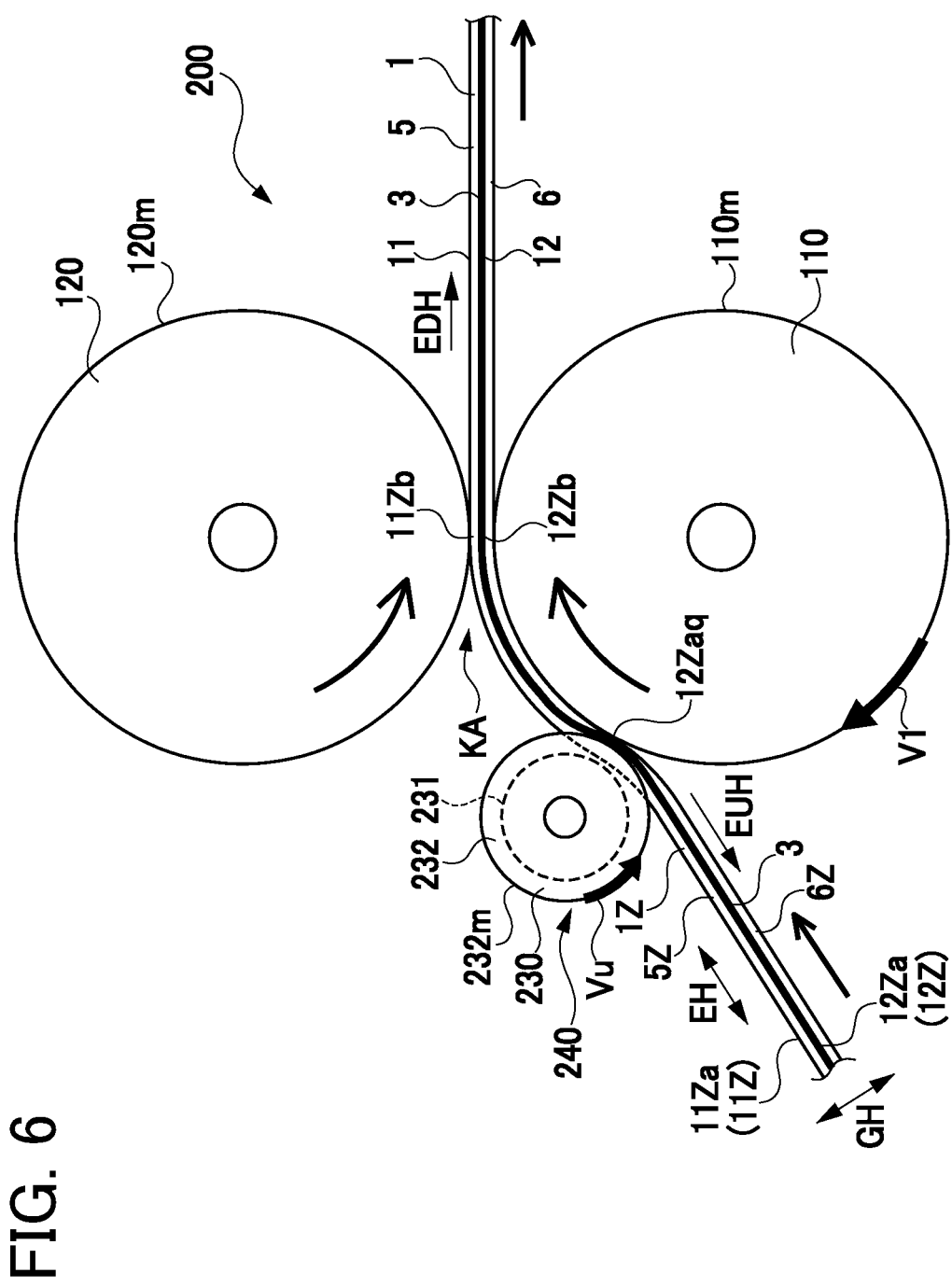
FIG. 6 is an explanatory sideways view of the strip-shaped electrode plate, the compressed strip-shaped electrode plate, and the roll press apparatus in the second embodiment.
Figure 7:
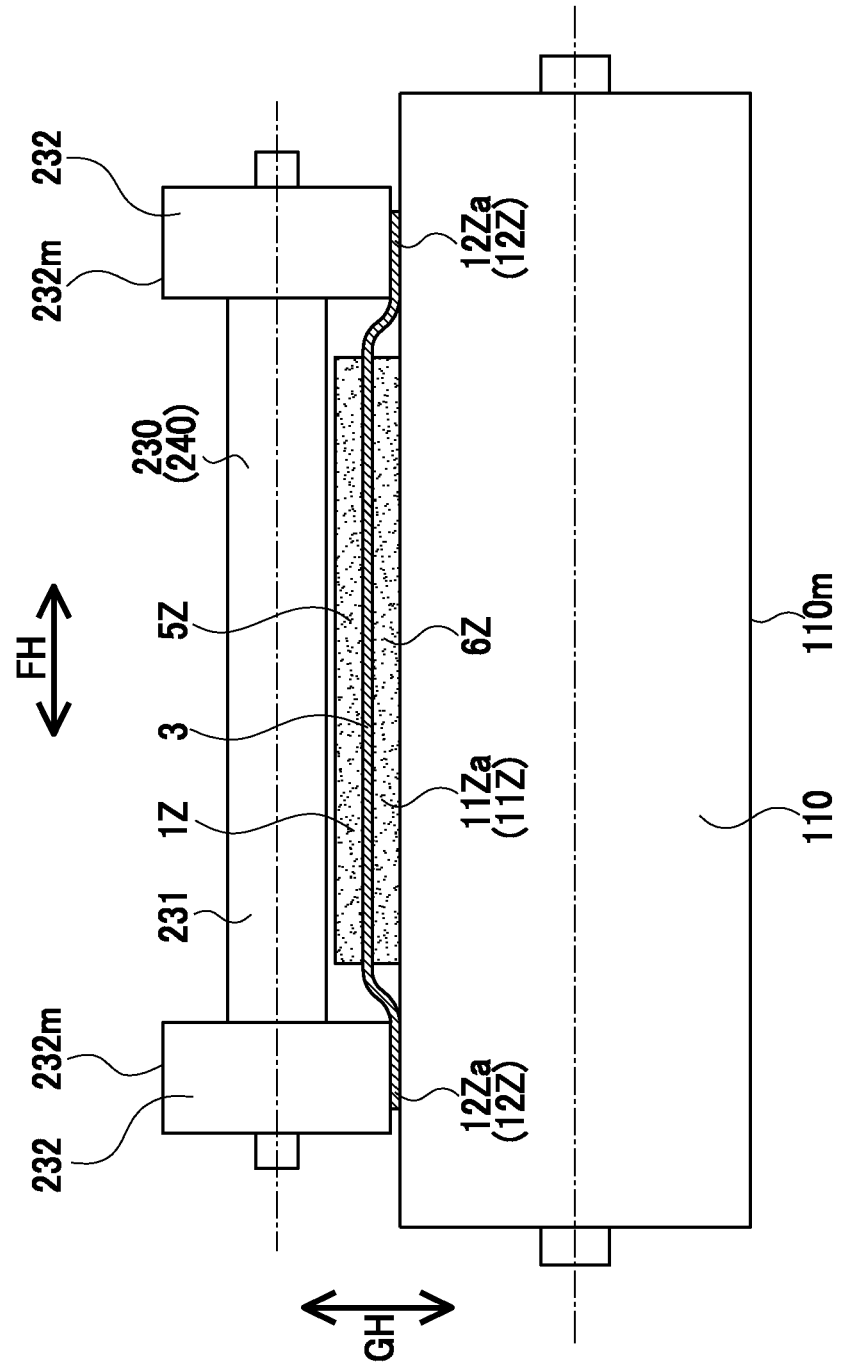
FIG. 7 is an explanatory view of the strip-shaped electrode plate, the first press roll, and the upstream-direction tensile roll in the second embodiment when they are seen from the upstream side.

Next, a second embodiment is explained. The roll press apparatus 100 in the first embodiment is exemplified by providing the tensile-force-ratio adjustment mechanism 140 including the upstream-direction tensile roll 130 as an elastic and follower roll (see FIG. 3 and FIG. 4). On the other hand, a roll press apparatus 200 of the present second embodiment is different in a manner that a tensile-force-ratio adjustment mechanism 240 including an upstream-direction tensile roll 230 as a metal and driving roll is provided (see FIG. 6 and FIG. 7).

The tensile-force-ratio adjustment mechanism 240 according to the present second embodiment includes the upstream-side tensile roll 230 placed near the roll gap KA on the upstream side EUH of the roll gap KA. This upstream-direction tensile roll 230 is a metal roll including a roll center portion 231 placed in a center and roll both-side portions 232 placed on both sides in the width direction FH of the roll center portion 231 and each formed with a roll surface 232m having a larger diameter than the roll center portion 231 and being made of stainless steel. The upstream-direction tensile roll 230 is further a driving roll to be driven and rotated in a counter-clockwise direction in FIG. 6 by a motor (not shown). The roll center portion 231 of a small diameter faces the pre-press active material portion 11Za of the active material portion 11Z of the strip-shaped electrode plate 1Z with a clearance. On the other hand, the roll surfaces 232m of the roll both-side portions 232 having the large diameter are each press-contacted with the pre-press active material absent portions 12Za of the active material absent portions 12Z of the strip-shaped electrode plate 1Z.

The upstream-direction tensile roll 230 is rotated in a counter-clockwise direction at a rotation speed set in a manner that a peripheral speed Vu of the roll both-side portions 232 is slower than a peripheral speed V1 of the first press roll 110 (Vu<V1) to some extent. Accordingly, in the pre-press active material absent portions 12Za (the current collecting foil 3), the tensile roll pressure portions 12Zaq (the obliquely hatched parts in FIG. 5) are press-contacted with the first press roll 110 and the roll both-side portions 232 of the upstream-direction tensile roll 230 and subjected to the tensile force Tq in the direction of the upstream side EUH by a frictional force from the roll both-side portions 232 (see FIG. 5). Therefore, the tensile roll pressure portions 12Zaq and the pre-press active material absent portions 12Za in the range of the downstream side EDH are pulled toward the upstream side EUH by the tensile force Tu2' (=Tu2+Tq) which is an addition of the original tensile force Tu2 and the tensile force Tq.

In the present second embodiment, the rotation speed of the upstream-direction tensile roll 230 is adjusted by applying the tensile force Tq=9.2 N which is equal to the tensile force Tp in the first embodiment. As a result of this, the upstream active material absent portion tensile force τu applied to the inter-roll active material absent portions 12Zb is also added by the tensile force Tq=9.2 N as compared with the case of not providing the upstream-direction tensile roll 230. Further, the downstream active material absent portion tensile force τd is as equal as the case of the first embodiment (τd=15.0 N).

Accordingly, while the tensile force ratio τd/τu of the upstream active material absent portion tensile force τu and the downstream active material absent portion tensile force τd which are applied to the inter-roll active material absent portions 12Zb is set as τd/τu=3.26 when the tensile-force-ratio adjustment mechanism 240 is not provided, the tensile force ratio can be adjusted to τd/τu=1.09 in a case that the pressing step S2 is carried out by use of the roll press apparatus 200 of the present second embodiment. Also in the present second embodiment, the tensile force ratio τd/τu can be made small and the imbalanced state between the tensile forces τd and τu can be made small, so that it is possible to restrain generation of wrinkles on the active material absent portions 12Z (the post-pressed active material absent portions 12) in roll-pressing.

Third Embodiment

Figure 8:
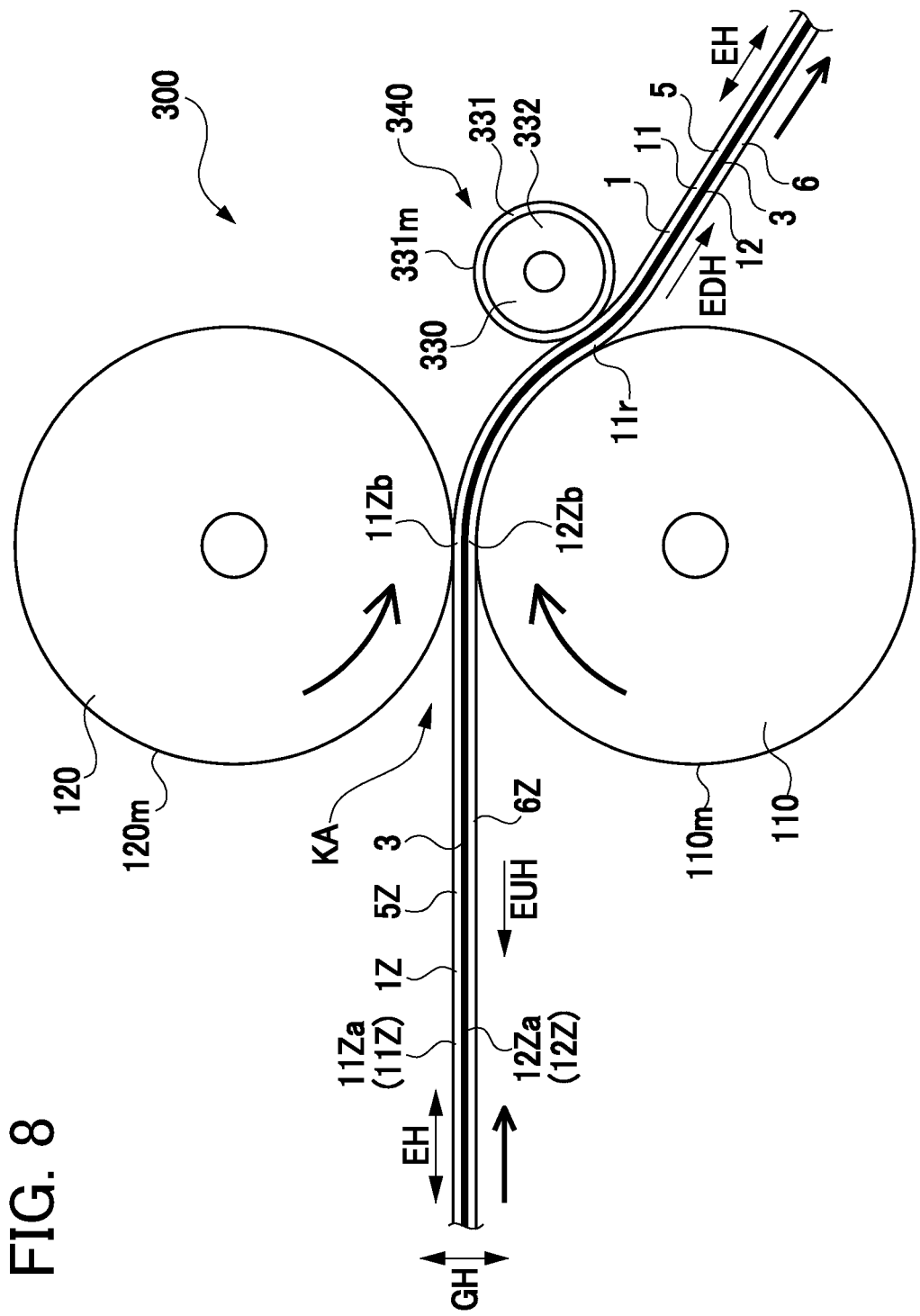
FIG. 8 is an explanatory sideways view of the strip-shaped electrode plate, the compressed strip-shaped electrode plate, and the roll press apparatus in the third embodiment.
Figure 9:
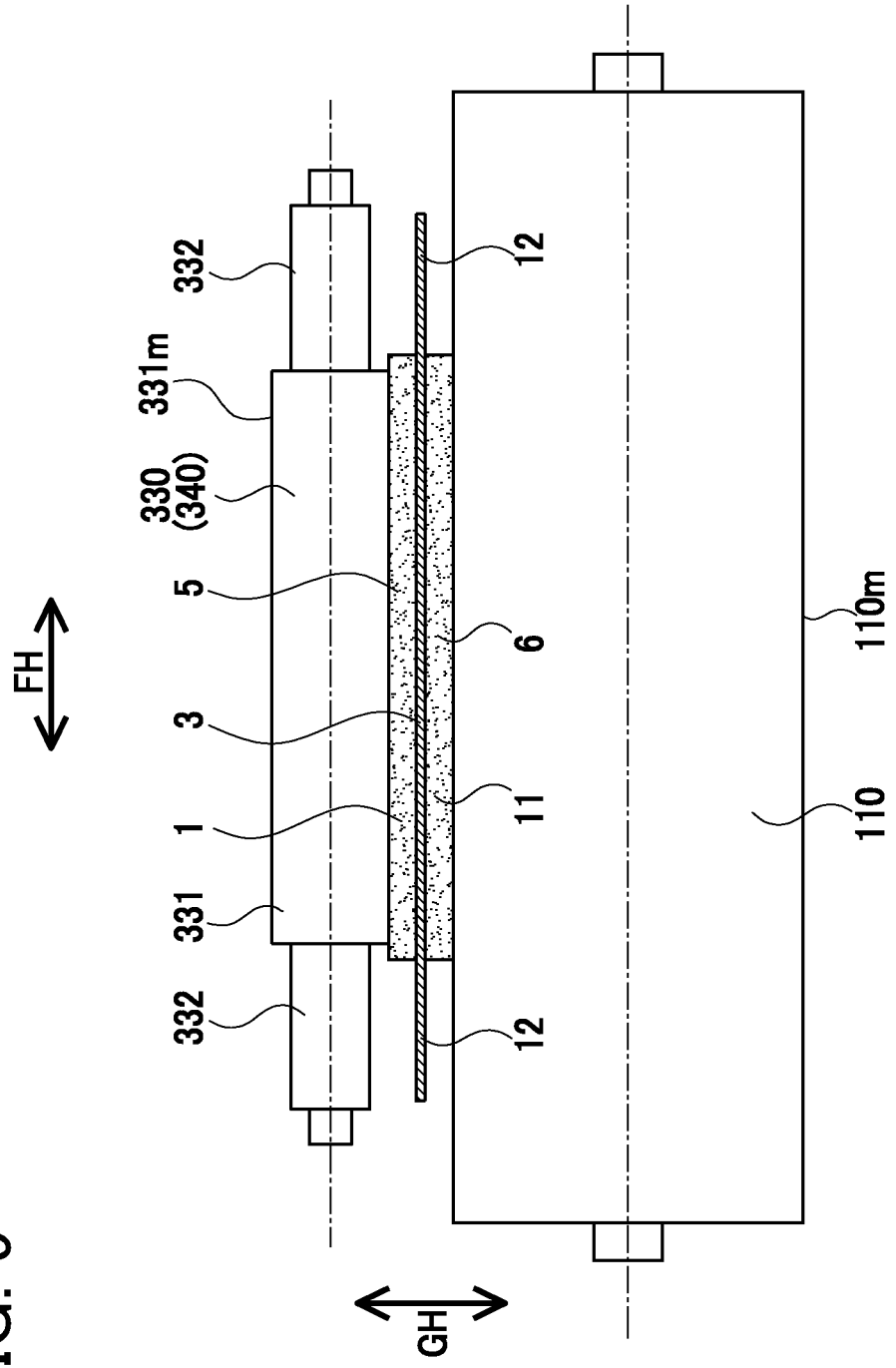
FIG. 9 is an explanatory view of the compressed strip-shaped electrode plate, the first press roll, and the upstream-direction tensile roll in the third embodiment when they are seen from a downstream side.

Next, a third embodiment is explained. The roll press apparatuses 100 and 200 of the first and second embodiments have been embodied with the tensile-force-ratio adjustment mechanisms 140 and 240 including the upstream-direction tensile rolls 130 and 230 to increase the upstream active material absent portion tensile force τu applied to the inter-roll active material absent portions 12Zb, respectively (see FIGS. 3 to 7). On the other hand, a roll press apparatus 300 of the present third embodiment is different from those embodiments in a manner that a tensile-force-ratio adjustment mechanism 340 including an upstream-direction tensile roll 330 to reduce a downstream active material absent portion tensile force τd applied to the inter-roll active material absent portions 12Zb is provided on the downstream side EDH of the roll gap KA (see FIGS. 8 to 10).

As explained in the first embodiment, also in the present third embodiment and a fourth embodiment which will be explained below, the entire roll-pressed compressed strip-shaped electrode plate 1 is subjected to a downward entire tensile force Td in a direction of the downward side EDH by a downstream-side tensile force applying unit (not shown, also in the present third embodiment, Td=30.0 N, for example). While the post-pressed active material portion 11 of the compressed strip-shaped electrode plate 1 is extended in the longitudinal direction EH by roll-pressing, the post-pressed active material absent portions 12 are hardly extended, and thus the downward entire tensile force Td is hardly applied to the post-pressed active material portion 11 (the tensile force Td1≈0) but applied to the two post-pressed active material absent portions 12 (see FIG. 10). Accordingly, the magnitude of the tensile force Td2 in the direction of the downstream side EDH applied to the post-pressed active material absent portions 12 is almost a half of the downward entire tensile force Td (Td2=Td/2). Also in the present third and fourth embodiments, the downward entire tensile force is Td=30.0 N, and accordingly, the tensile force Td2 in the direction of the downstream side EDH is each roughly set as Td2=15.0 N.

The tensile-force-ratio adjustment mechanism 340 according to the present third embodiment is provided with an upstream-direction tensile roll 330 placed on the downstream side EDH of the roll gap KA and near the roll gap KA. This upstream-direction tensile roll 330 is an elastically deformable elastic roll formed with a roll surface 331m made of rubber in a roll center portion 330, and also a follower roll rotating in association with conveyance of the compressed strip-shaped electrode plate 1. This upstream-direction tensile roll 330 is press-contacted with a tensile roll pressure part 11r (in FIG. 10, obliquely hatched parts) of the post-pressed active material portion 11 of the compressed strip-shaped electrode plate 1, and this tensile roll pressure part 11r is being pressed against the first press roll 110 and pulled toward the upstream side EUH, so that the downstream active material absent portion tensile force τd applied to the inter-roll active material absent portions 12Zb is reduced.

The upstream-direction tensile roll 330 of the present third embodiment includes the roll center portion 331 placed in a center of the width direction FH and roll both-side portions 332 placed on both sides in the width direction FH of the roll center portion 331 with a smaller diameter than the roll center portion 331. Each of the roll both-side portions 332 and the roll center portion 331 may have the equal diameter. The roll surface 331m of the roll center portion 331 is press-contacted with the tensile roll pressure portion 11r of the post-pressed active material portion 11 of the compressed strip-shaped electrode plate 1. On the other hand, the roll both-side portions 322 face the post-pressed active material absent portions 12 of the compressed strip-shaped electrode part 1 with a clearance.

To be more specific, the roll center portion 331 of the upstream-direction tensile roll 330 is to hold and press the tensile roll pressure portion 11r between the roll center portion 331 and the first press roll 110 by pressing the tensile roll pressure portion 11r of the post-pressed active material portion 11 against the first press roll 110. As mentioned above, the upstream-direction tensile roll 330 is an elastic and follower roll in which the roll surface 331m is elastically deformable. Thus, rotation resistance of the upstream-direction tensile roll 330 leads to generation of the tensile force Tr in the direction of the upstream side EUH on the tensile roll pressure portion 11r that has been press-contacted with the roll center portion 331 of the upstream-direction tensile roll 330. Herein, the magnitude of the rotation resistance of the upstream-direction tensile roll 330 changes according to the magnitude of the press-contact force of the upstream-direction tensile roll 330 (the roll center portion 331) applied to the tensile roll pressure portion 11r and the first press roll 110. When this rotation resistance is made larger, it is possible to increase the tensile force Tr in the direction of the upstream side EUH applied to the tensile roll pressure portion 11r which has been press-contacted with the upstream-direction tensile roll 330 and the post-pressed active material portion 11 on the downstream side EDH downstream of the tensile roll pressure portion 11r.

Figure 10:
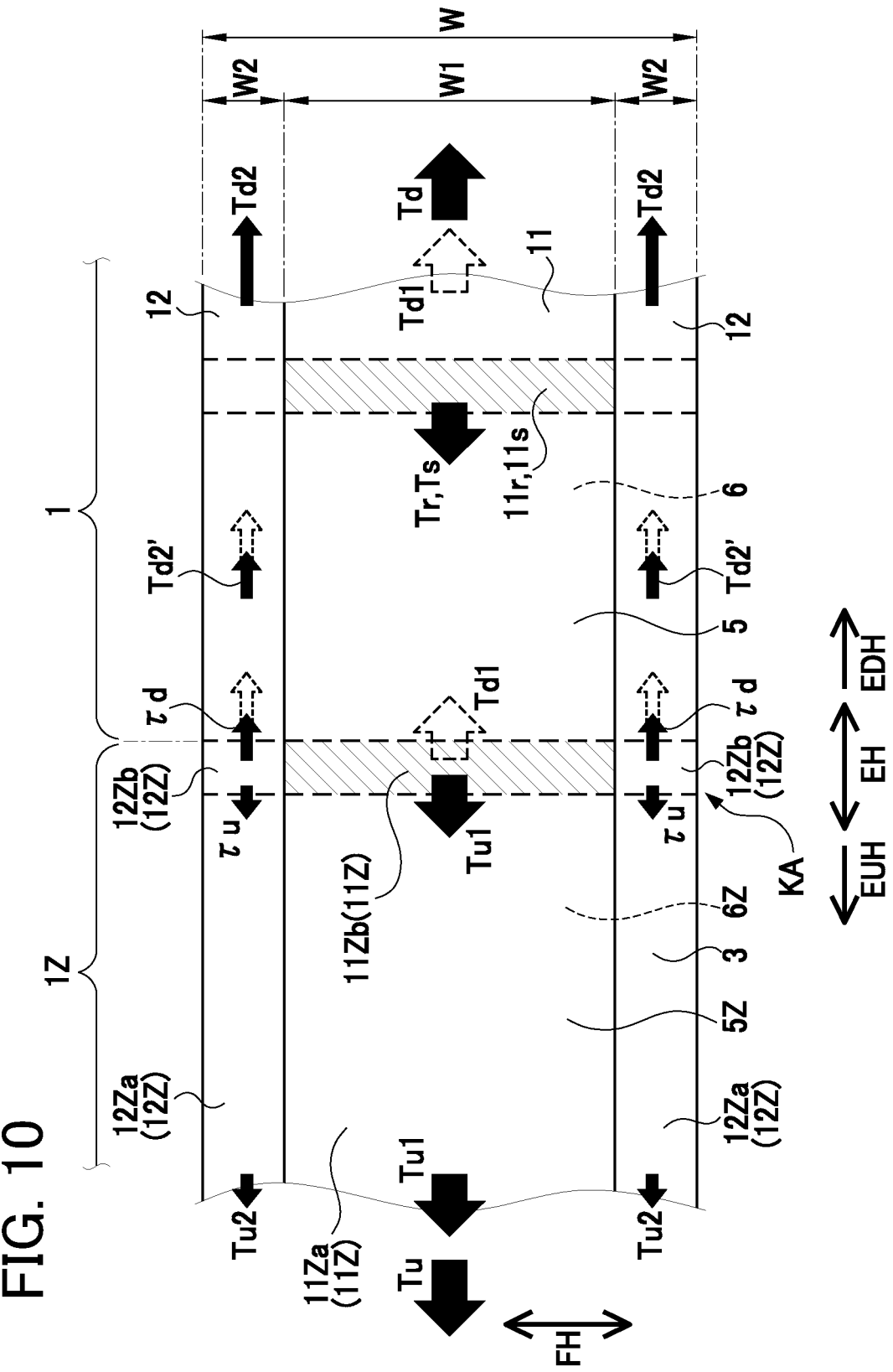
FIG. 10 is an explanatory view for explaining the tensile force applied to the strip-shaped electrode plate and the compressed strip-shaped electrode plate before and after roll-pressing in the third and fourth embodiments.

As shown in FIG. 10, the tensile force Tr in the direction of the upstream side EUH applied to the tensile roll pressure portion 11r is applied in an opposite direction from the downward entire tensile force Td which is applied in the entire width direction FH of the pressed compressed strip-shaped electrode plate 1. Accordingly, in a range from the roll gap KA to the tensile roll pressure portion 11r in the compressed strip-shaped electrode plate 1, the downward entire tensile force Td applied to this compressed strip-shaped electrode plate 1 in the downward direction can be lessened. Within this range, then, the tensile force Td2' applied to the pressed active material absent portions 12 in the direction of the downstream side EDH can be made smaller than the tensile force Td2 (Td2'=(Td−Tr)/2<Td2=Td/2). Therefore, the downstream active material absent portion tensile force τd applied in the direction of the downstream side EDH in the inter-roll active material absent portions 12Zb can also be made small according to the magnitude of the generated tensile force Tr.

In the present third embodiment, the press-contact force of the upstream-direction tensile roll 330 is adjusted such that the tensile force Tr is set as Tr=18.0 N, for example. As a result of this, in the present third embodiment, the tensile force Td2' and the downstream active material absent portion tensile force τd can be set as Td2'=τd=(Td−Tr)/2= (30.0−18.0)/2=6.0 N, resulting in decrease in the tensile force as compared with the original tensile force Td2=15.0 N.

Therefore, also in the present third embodiment, it is possible to reduce the tensile force ratio τd/τu of the upstream active material absent portion tensile force τu and the downstream active material absent portion tensile force τd which are applied to the inter-roll active material absent portions 12Zb. For example, in the present third embodiment, when the tensile-force adjustment mechanism 340 is not provided, the tensile force ratio is τd/τu=15/4.6=3.26, but on the other hand, when the pressing step S2 is carried out by use of the roll press apparatus 300 of the present third embodiment, the tensile force ratio can be adjusted to τd/τu=6.0/4.6=1.30. The tensile force ratio τd/τu is thus made small and the imbalance between the tensile forces τd and τu is made small, thereby achieving restraint in generation of wrinkles in the active material absent portions 12Z (the post-pressed active material absent portions 12) in roll-pressing.

Fourth Embodiment

Figure 11:
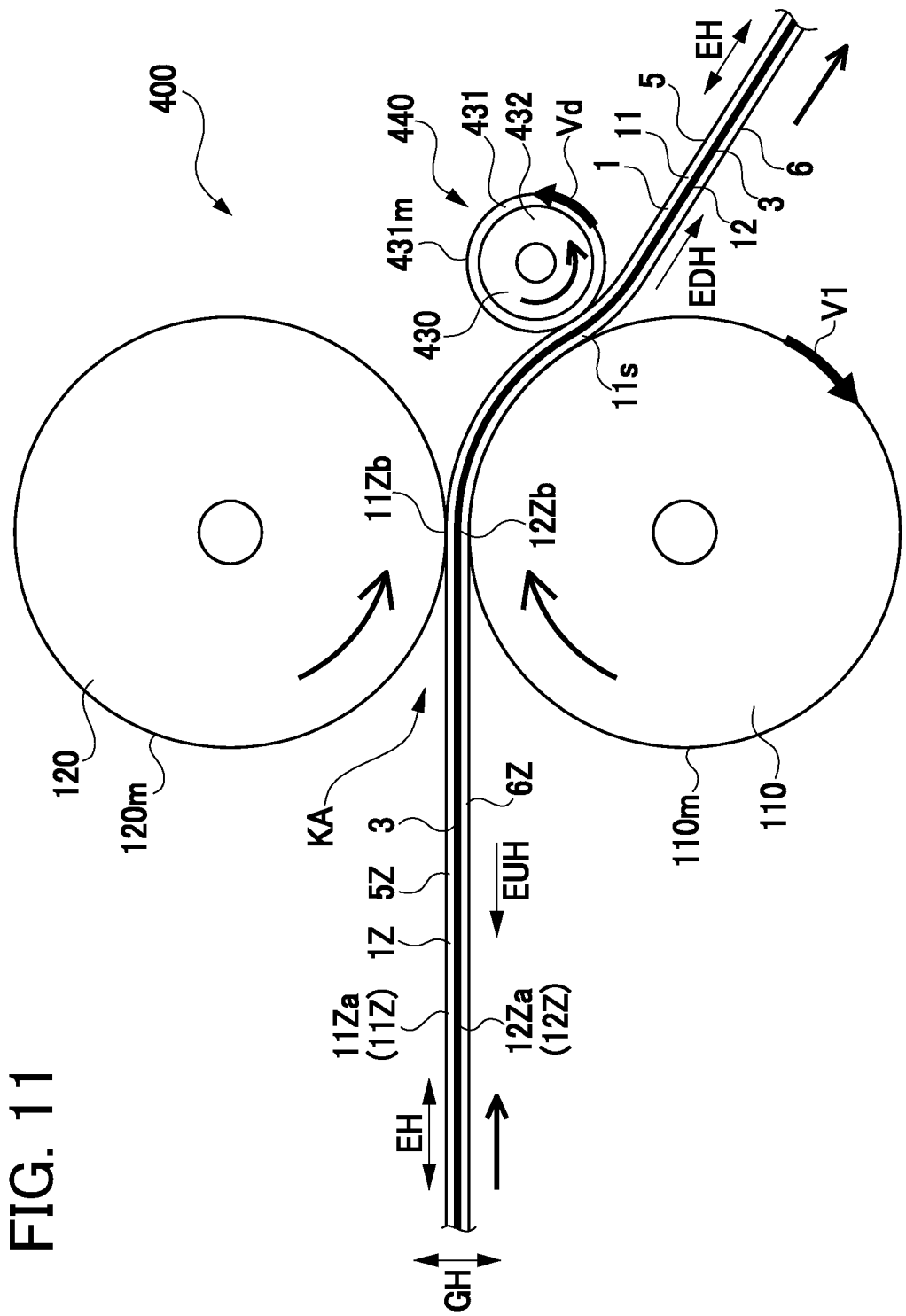
FIG. 11 is an explanatory sideways view of the strip-shaped electrode plate, the compressed strip-shaped electrode plate, and the roll press apparatus in the fourth embodiment.
Figure 12:
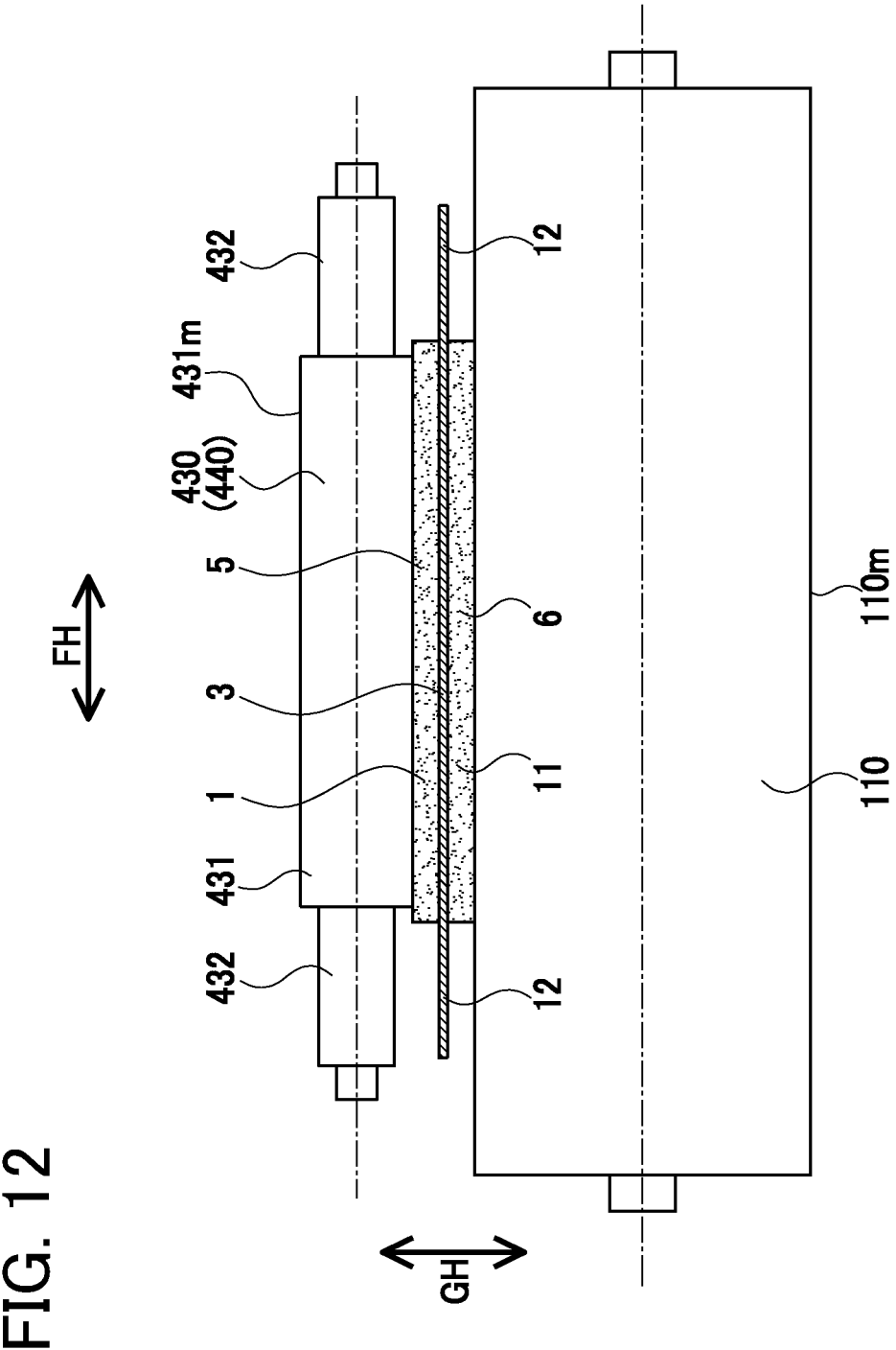
FIG. 12 is an explanatory view of the compressed strip-shaped electrode plate, the first press roll, and the upstream-direction tensile roll in the fourth embodiment when they are seen from the downstream side.

Next, a fourth embodiment is explained. The roll press apparatus 300 in the third embodiment is exemplified with providing the tensile force ratio adjustment mechanism 340 including the upstream-direction tensile roll 330 as an elastic and follower roll (see FIG. 8 to FIG. 10). On the other hand, a roll press apparatus 400 in the present fourth embodiment is different from that in the third embodiment in a manner that a tensile-force-ratio adjustment mechanism 440 including an upstream-direction tensile roll 430 as a metal and driving roll is provided (see FIG. 10 to FIG. 12).

The tensile-force-ratio adjustment mechanism 440 according to the present fourth embodiment is provided with an upstream-direction tensile roll 430 placed on a downstream side EDH of the roll gap KA and near the roll gap KA. This upstream-direction tensile roll 430 is a metal roll having a roll surface 431m made of stainless steel in a roll center portion 431 and also a driving roll to be driven in a counter-clockwise direction in FIG. 11 by a motor (not shown). This upstream-direction tensile roll 430 is provided with the roll center portion 431 placed in a center portion in the width direction FH and roll both-side portions 432 placed on both sides of the roll center portion 441 in the width direction FH and each having a smaller diameter than the roll center portion 431. Herein, the roll both-side portions 432 and the roll center portion 431 may have the equal diameter. The roll surface 431m of the roll center portion 431 is press-contacted with the tensile roll pressure portion 11s (the obliquely hatched part in FIG. 10) of the post-pressed active material portion 11 of the compressed strip-shaped electrode plate 1. Further, the roll both-side portions 432 face the post-pressed active material absent portions 12 of the compressed strip-shaped electrode plate 1 with a clearance, respectively.

The upstream-direction tensile roll 430 is configured to rotate in the counter-clockwise direction such that a peripheral speed Vd of the roll center portion 431 is some slower than a peripheral speed V1 of the first press roll 110 (Vd<V1). Therefore, in the post-pressed active material portion 11, the tensile roll pressure portion 11s (the obliquely hatched part in FIG. 10) is press-contacted with the first press roll 110 and the roll center portion 431, and thus the tensile force Ts in the direction of the upstream side EUH is generated by a friction force applied by this roll center portion 431 (see FIG. 10).

Also in the present fourth embodiment as similar to the third embodiment, as shown in FIG. 10, the tensile force Ts applied to the tensile roll pressure portion 11s in the direction of the upstream side EUH faces opposite to the downstream entire tensile force Td applied to the compressed strip-shaped electrode plate 1 over the entire width direction FH. Thus, in the range of the compressed strip-shaped electrode plate 1 from the roll gap KA to the tensile roll pressure portion 11s, it is possible to lessen the downstream entire tensile force Td applied to the compressed strip-shaped electrode plate 1. Accordingly, in this range, the tensile force Td2' applied to the post-pressed active material absent portions 12 in the direction of the downstream side EDH can be made smaller than the tensile force Td2 (Td2'=(Td−Ts)/2<Td2=Td/2). Therefore, the downstream active material absent portion tensile force τd applied in the direction of the downstream side EDH in the respective inter-roll active material absent portions 12Zb can also be made small according to the generated tensile force Ts.

Also in the present fourth embodiment, the rotation speed of the upstream-direction tensile roll 430 is adjusted such that the tensile force Ts is set as Ts=18.0 N. Therefore, also in the present fourth embodiment, the tensile force Td2' and the downstream active material absent tensile force τd can be set as Td2'=τd=(Td−Ts)/2=(30.0−18.0)/2=6.0 N, thereby reducing the forces as compared with the original tensile force Td2=15.0 N.

Therefore, also in the present fourth embodiment, the tensile force ratio τd/τu of the upstream active material absent portion tensile force τu and the downstream active material absent portion tensile force τd which are applied to the inter-roll active material absent portions 12Zb can be made small. For example, in the present fourth embodiment, while the tensile force ratio is set as τd/τu=3.26 in a case that the tensile-force-ratio adjustment mechanism 440 is not provided, the tensile force ratio can be adjusted as τd/τu=6.0/4.6=1.30 as similar to the third embodiment in a case that the pressing step S2 is carried out by use of the roll press apparatus 400 of the present fourth embodiment. This reduction in the tensile force ratio τd/τu and reduction in the imbalance between the tensile forces τd and τu can also achieve restraint in generation of wrinkles on the active material absent portions 12Z (the post-pressed active material absent portions 12) in roll-pressing.

Fifth Embodiment

Figure 13:
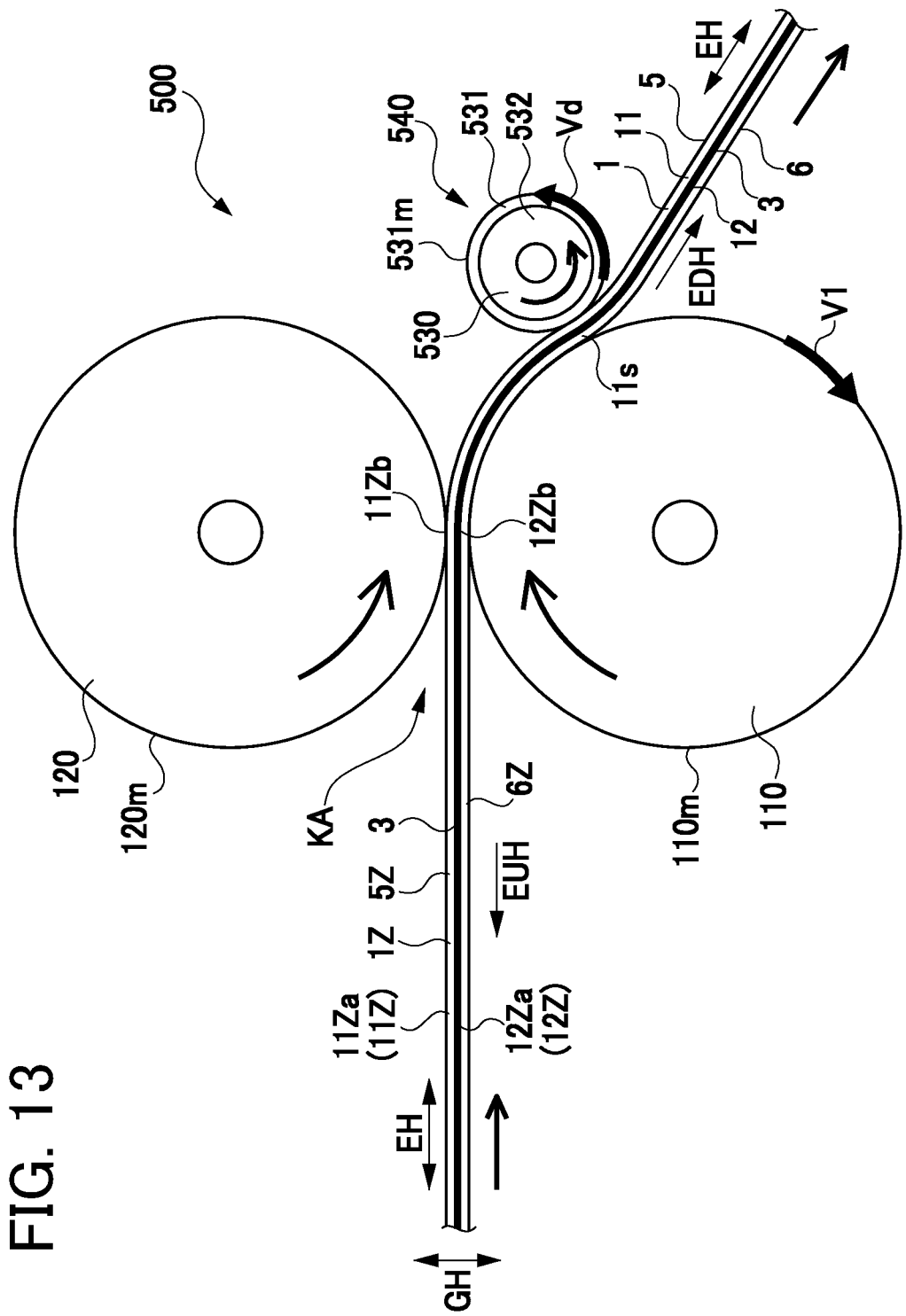
FIG. 13 is an explanatory sideways view of the strip-shaped electrode plate, the compressed strip-shaped electrode plate, and the roll press apparatus in the fifth embodiment.
Figure 14:
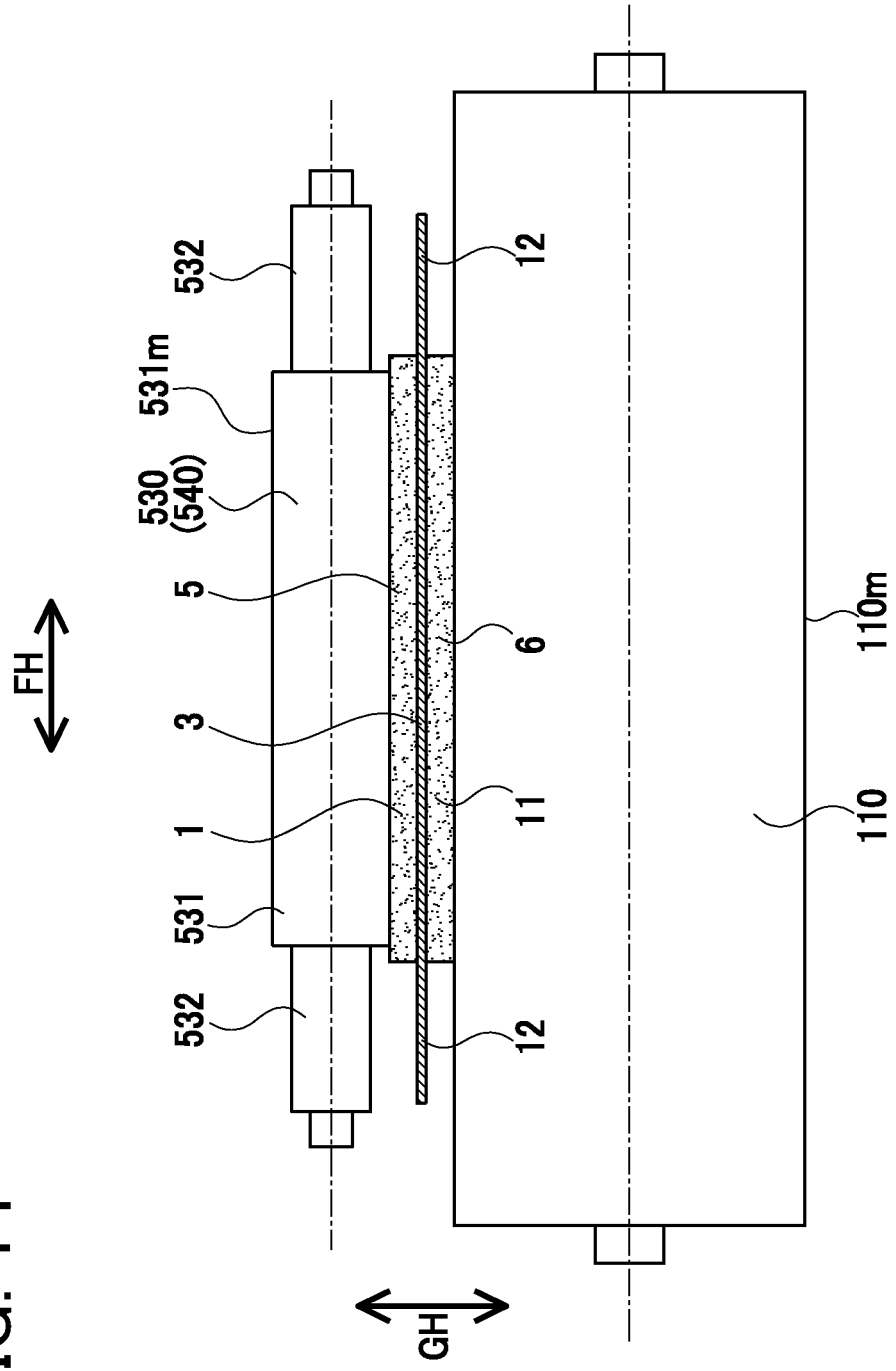
FIG. 14 is an explanatory view of the compressed strip-shaped electrode plate, the first press roll, and a downstream-side driving roll in the fifth embodiment when they are seen from the downstream side.

Next, a fifth embodiment is explained. A roll press apparatus 500 of the present fifth embodiment is provided with a tensile-force-ratio adjustment mechanism 540 (see FIG. 13 to FIG. 15) including a downstream-side driving roll (a downstream-direction tensile roll) 530 to press the post-pressed active material portion 11 after roll-pressing against the first press roll 110 and pull the post-pressed active material portion 11 toward the downstream side EDH. This downstream-side driving roll 530 is placed on the downstream side EDH of the roll gap KA between the first press roll 110 and the second press roll 120 and near the roll gap KA. The downstream-side driving roll 530 is a metal roll provided with a roll center portion 531 formed with a roll surface 531m made of stainless steel and a driving roll to be driven and rotated in a counter-clockwise direction in FIG. 12 by a motor (not shown).

The downstream-side driving roll 530 is formed with the roll center portion 531 placed in a center portion in the width direction FH and roll both-side portions 532 placed on both sides of the roll center portion 531 in the width direction FH and each having a smaller diameter than the roll center portion 531. Herein, the roll both-side portions 532 and the roll center portion 531 may have the equal diameter. The roll surface 531m of the roll center portion 531 is to be press-contacted with a roll pressure portion 11t (an obliquely hatched part in FIG. 15) of the post-pressed active material portion 11 of the compressed strip-shaped electrode plate 1. On the other hand, each of the roll both-side portions 532 faces the post-pressed active material absent portion 12 of the compressed strip-shaped electrode plate 1 with a clearance therebetween.

The downstream-direction driving roll 530 is to rotate in an opposite direction from the first press roll 110 at a rotation speed some faster in the peripheral speed Vd of the roll center portion 531 than the peripheral speed V1 of the first press roll 110 (Vd>V1). As mentioned above, in the compressed strip-shaped electrode plate 1 which has been roll-pressed, while the post-pressed active material portion 11 has been extended in the longitudinal direction EH by pressing, the post-pressed active material absent portion 12 has hardly been extended. Therefore, when the downstream-direction driving roll 530 is not provided, the post-pressed active material portion 11 gets loosened.

To address this, in the present fifth embodiment, the downstream-direction driving roll 530 rotates at the fast peripheral speed Vd with pressing the post-pressed active material portion 11 against the first press roll 110. By this fast rotation, the post-pressed active material portion 11 which has been pressed and loosened is sequentially fed out to the downstream side EDH, so that there is no loosening generated in the post-pressed active material portion 11 between the roll gap KA and the downstream-direction driving roll 530 and the compressed strip-shaped electrode plate 1 results in a stretched state over the entire width direction FH.

Accordingly, when there is no downstream-direction driving roll 530 provided, the downward entire tensile force Td (=30.0 N) is hardly applied to the post-pressed active material portion 11 (the tensile force Td1 applied to the inter-roll active material portion 11Zb is set as Td1≈0), so that the downstream active material absent portion tensile force τd applied to the two inter-roll active material absent portions 12Zb becomes large (τd=Td/2=15.0 N) (see FIG. 5).

Figure 15:
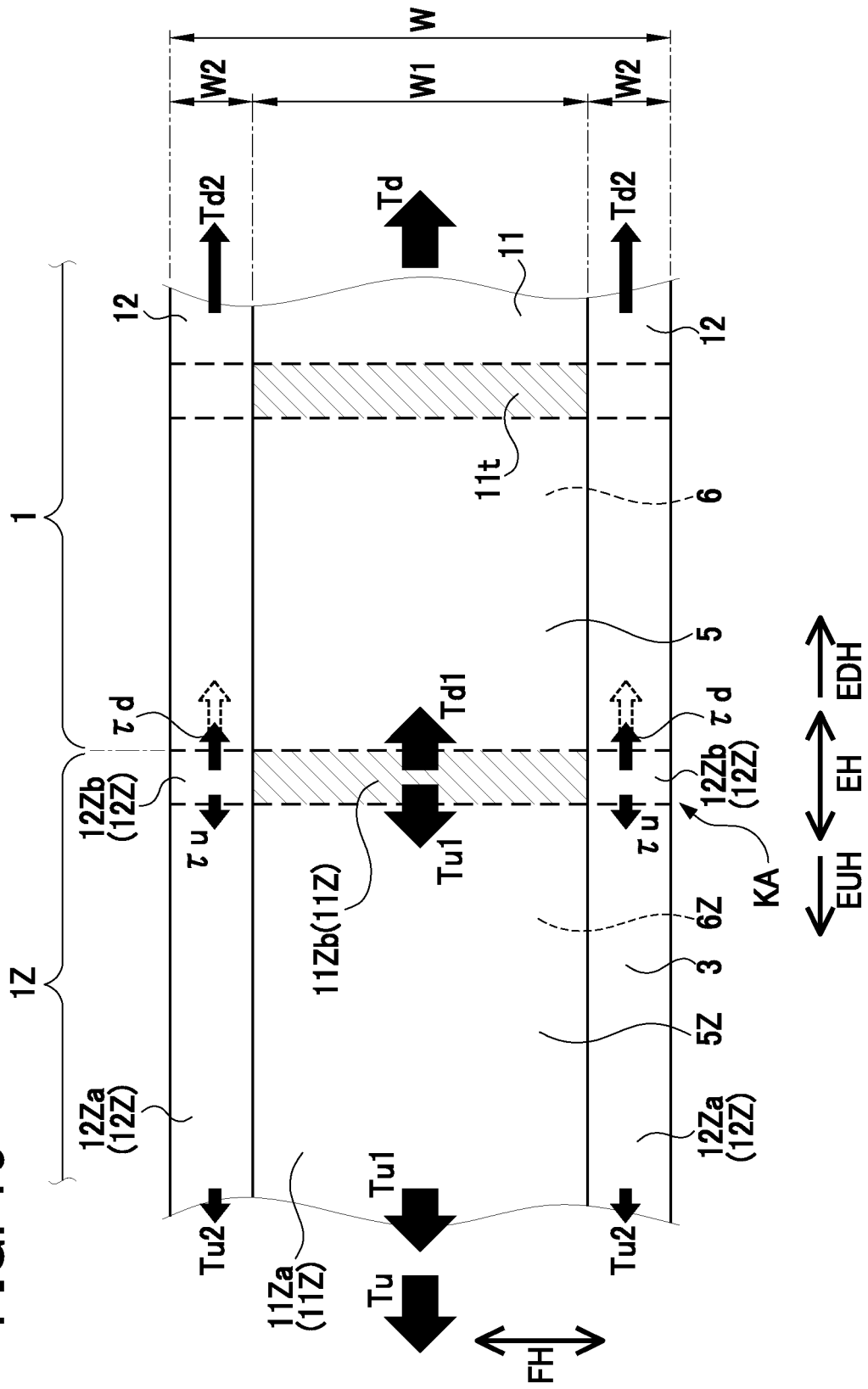
FIG. 15 is an explanatory view for explaining the tensile force applied to the strip-shaped electrode plate and the compressed strip-shaped electrode plate before and after roll-pressing in the fifth embodiment.

To address this, in the present fifth embodiment, a part of the downstream entire tensile force Td is made to be applied to the post-pressed active material portion 11 (the tensile force Td1 is also applied to the inter-roll active material portion 11Zb), and thus the downstream active material absent portion tensile force τd applied to the two inter-roll active material absent portions 12Zb is made small by that force (see FIG. 15). Specifically, a position of providing the downstream-side driving roll 530 and the peripheral speed Vd of the downstream-side driving roll 530 are adjusted to make the downstream active material absent tensile force τd applied to the respective inter-roll active material absent portions 12Zb as small as τd=6.0 N.

Accordingly, also in the present fifth embodiment, the tensile force ratio τd/τu of the upstream active material absent portion tensile force τu and the downstream active material absent portion tensile force τd which are applied to the inter-roll active material absent portions 12Zb can be made small. For example, in the present fifth embodiment, while the tensile force ratio is set as τd/τu=3.26 when the tensile-force-ratio adjustment mechanism 540 is not provided, the tensile force ratio can be adjusted as τd/τu=6.0/4.6=1.30, when the pressing step S2 is carried out by use of the roll press apparatus 500 of the present fifth embodiment as similar to the third and fourth embodiments. Reduction in the tensile force ratio τd/τu and reduction in the imbalance between the tensile forces τd and τu in this manner also leads to restraint in generation of wrinkles on the active material absent portions 12Z (the post-pressed active material absent portions 12) in roll-pressing.

(Experimental Results)

Figure 16:
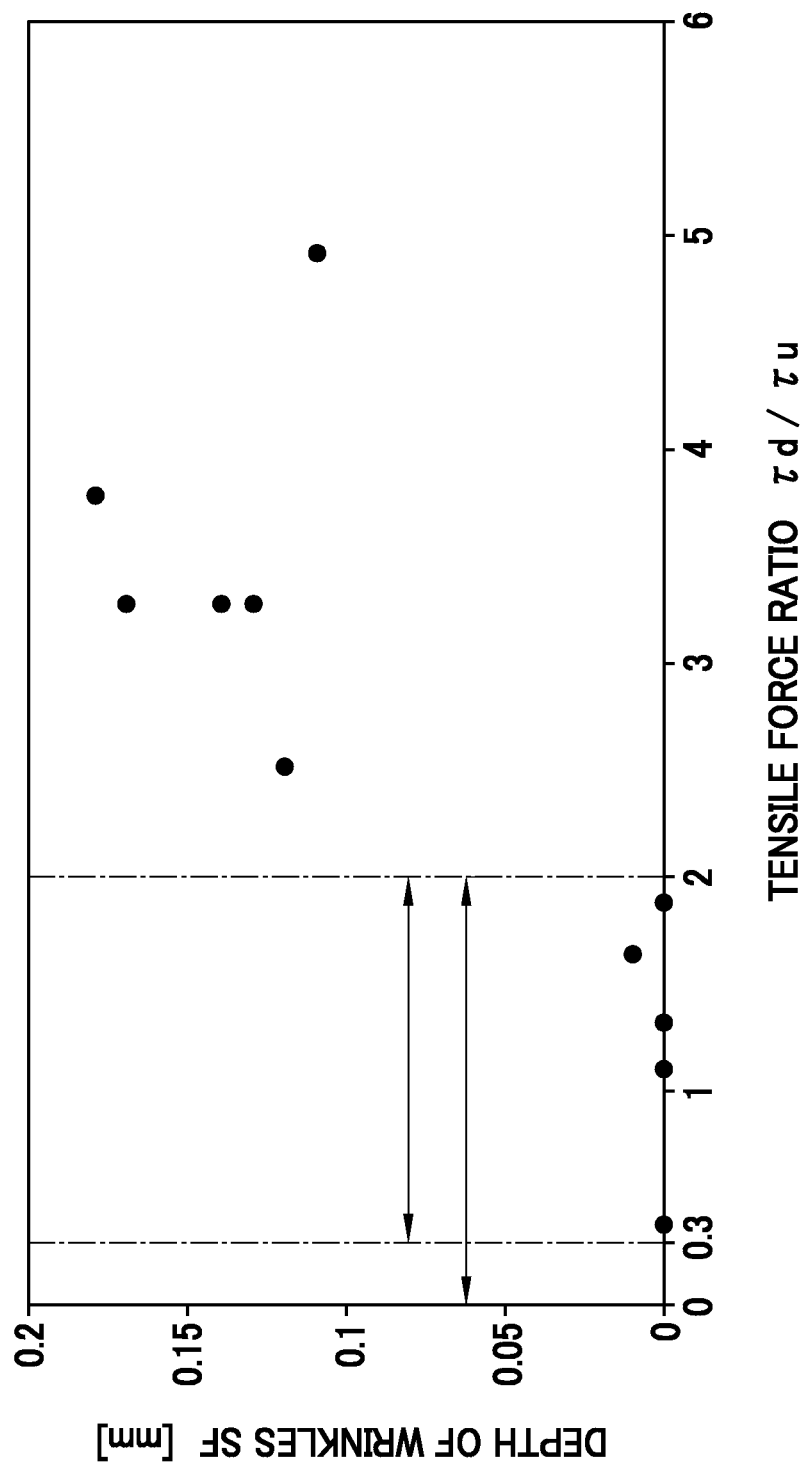
FIG. 16 is a graph showing a relationship between a tensile force ratio τd/τu of tensile forces τu and τd which are applied to an inter-roll active material absent portion and a depth SF of wrinkles generated in the active material absent portion.
Figure 17:
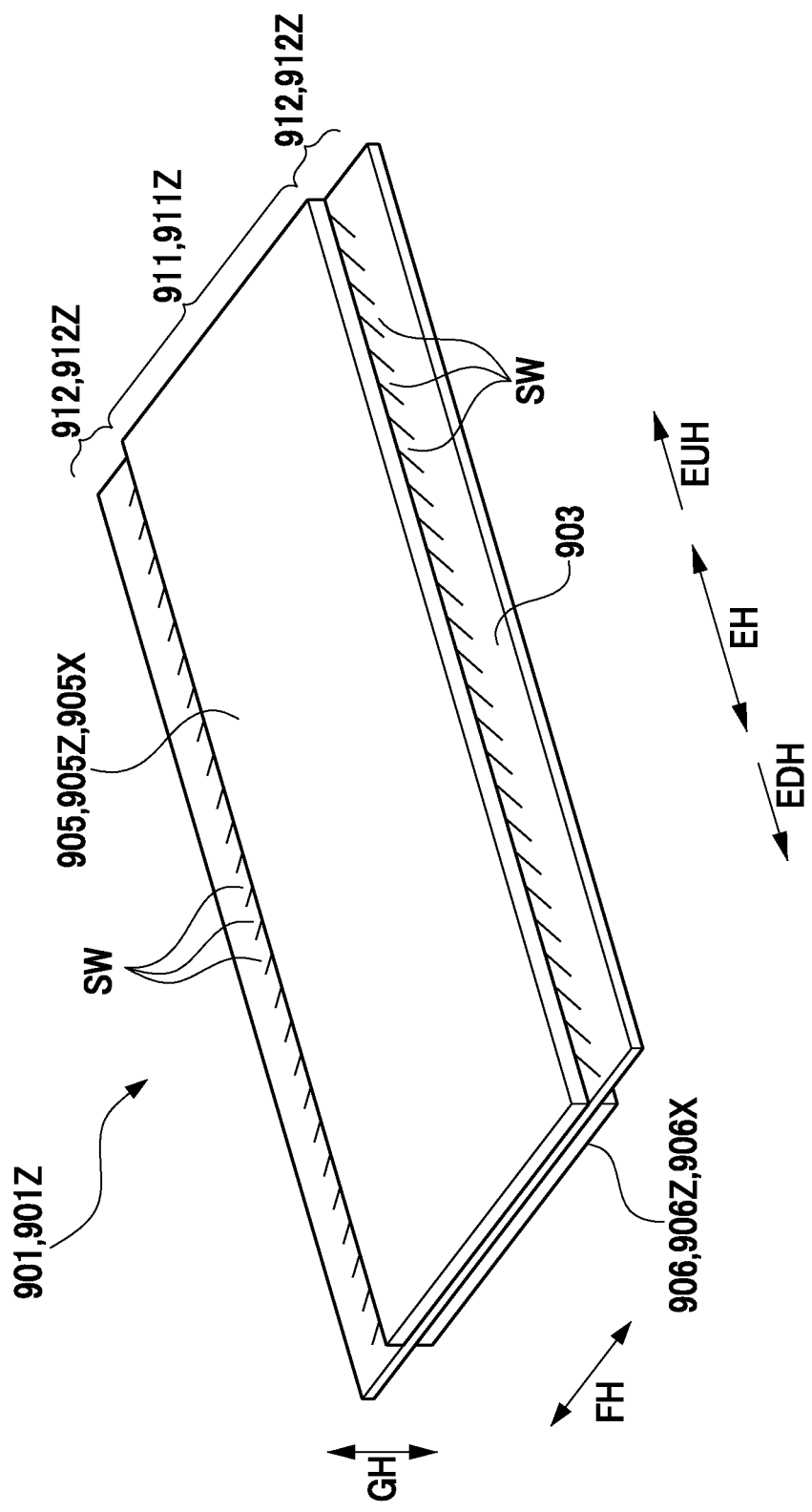
FIG. 17 is a perspective view of a compressed strip-shaped electrode plate according to a conventional technique.

It is now explained about results of an experiment carried out for inspecting a relationship between wrinkles generated on the current collecting foil 3 constituting the post-pressed active material absent portion 12 and a value of the tensile force ratio τd/τu (see a table 1 and FIG. 16). As indicated in the table 1, the compressed strip-shaped electrode plates 1 according to examples 1 to 11 are manufactured and a depth SF (mm) of the wrinkles generated on the current collecting foil 3 constituting the post-pressed active material absent portion 12 is inspected. To be specific, the electrode plate forming step S1 is carried out and the strip-shaped electrode plates 1Z are formed. Thereafter, a roll press apparatus 140 provided in the above-mentioned roll press apparatus 100 is used as a usual roll press apparatus (not shown) for performing the pressing step S2 to manufacture the compressed strip-shaped electrode plates 1. However, in the respective examples, an upstream-side tensile force applying unit (not shown) changes the magnitude of the upstream entire tensile force Tu applied to the entire width direction FH of the strip-shaped electrode plate 1Z which is being conveyed and the magnitude of the downstream entire tensile force Td applied to the entire width direction FH of the compressed strip-shaped electrode plate 1 during conveyance so that the compressed strip-shaped electrode plate 1 in the respective examples are manufactured.

post-pressed active material absent portions 12. On the other hand, when the tensile force ratio τd/τu is made small to reduce the imbalance between the tensile forces τd and τu such as at least within a range of τd/τu≤2.0, it has been confirmed that there are hardly generated wrinkles on the post-pressed active material absent portions 12. Accordingly, it can be understood that the roll press apparatuses 100 to 500 provided with the tensile-force-ratio adjustment mechanisms 140 to 540 as shown in the first to fifth embodiments are preferably used to reduce the tensile force ratio τd/τu and reduce the imbalance between the tensile forces τd and τu, specifically by adjusting the tensile force ratio as τd/τu≤2.0 and carrying out the pressing step S2. On the other hand, the productivity of the compressed strip-shaped electrode plates 1 can be made preferable by enlarging the downstream active material absent portion tensile force τd to some extent and carrying out the pressing step S2

TABLE 1

| Examples | Upstream entire tensile force Tu(N) | Upstream active material absent portion tensile force τu (N) | Downstream entire tensile force Td(N) | Downstream active material absent portion tensile force τd (N) | Tensile force ratio τd/τu | Depth of wrinkle (mm) |
|---|---|---|---|---|---|---|
| 1 | 150.0 | 22.9 | 150.0 | 75.0 | 3.27 | 0.13 |
| 2 | 200.0 | 30.6 | 230.0 | 115.0 | 3.76 | 0.18 |
| 3 | 300.0 | 45.8 | 230.0 | 115.0 | 2.51 | 0.12 |
| 4 | 20.0 | 3.1 | 30.0 | 15.0 | 4.91 | 0.11 |
| 5 | 60.0 | 9.2 | 60.0 | 30.0 | 3.27 | 0.14 |
| 6 | 90.0 | 13.8 | 90.0 | 45.0 | 3.27 | 0.17 |
| 7 | 60.0 | 9.2 | 30.0 | 15.0 | 1.64 | 0.01 |
| 8 | 75.0 | 11.5 | 30.0 | 15.0 | 1.31 | Less than 0.01 |
| 9 | 90.0 | 13.8 | 30.0 | 15.0 | 1.09 | Less than 0.01 |
| 10 | 90.0 | 13.8 | 10.0 | 5.0 | 0.36 | Less than 0.01 |
| 11 | 400.0 | 61.1 | 230.0 | 115.0 | 1.88 | Less than 0.01 |

Thereafter, the compressed strip-shaped electrode plates 1 of the respective examples are each measured with a depth SF (mm) of the wrinkles generated on the current collecting foil 3 constituting the post-pressed active material absent portion 12. Specifically, the current collecting foil 3 constituting the post-pressed active material absent 12 is cut out from each of the compressed strip-shaped electrode plate 1 in the respective examples by 20 mm in the longitudinal direction EH. Then, the thus cut-out current collecting foil 3 is disposed on an electrostatic adsorption stage to be electrostatically adsorbed, and thereby the depth SF of the wrinkles is measured by a laser microscope with a flat portion having no wrinkles (dents) as a reference.

A relationship between the tensile force ratio τd/τu of the tensile forces τu and τd applied to the inter-roll active material absent portions 12Zb of the active material absent portions 12Z and the depth SF (mm) of the wrinkles generated on the current collecting foil 3 constituting the post-pressed active material absent portions 12 is shown in a graph of FIG. 16.

In the present experiments, the upstream active material absent portion tensile force τu is calculated by τu=Tu×(W2/W)=Tu×(33/216). On the other hand, the downstream active material absent portion tensile force τd is calculated by τd=Td/2.

As clear from FIG. 16, when the tensile force ratio τd/τu is too large such as about equal to or larger than 2.5, deep wrinkles over a depth of 0.1 mm are generated on the with the tensile force ratio τd/τu to be set as τd/τu≥0.3. Therefore, it is preferable to set the tensile force ratio τd/τu as τd/τu≤2.0 and further preferably, set as 0.3≤τd/τu≤2.0.

As explained above, the roll press apparatuses 100, 200, 300, 400, and 500 of the first to fifth embodiments are provided with the tensile-force-ratio adjustment mechanisms 140, 240, 340, 440, and 540, respectively. When the strip-shaped electrode plate 1Z is to be roll-pressed by using these roll press apparatuses 100 and others, the strip-shaped electrode plate 1Z can be roll-pressed with adjusting the balance of the tensile force applied to the inter-roll active material absent portions 12Zb of the active material absent portions 12Z, specifically, adjusting the tensile force ratio τd/τu of the upstream active material absent portion tensile force τu and the downstream active material absent portion tensile force τd which are applied to the inter-roll active material absent portion 12Zb, and thus the compressed strip-shaped electrode plate 1 can be manufactured.

Further, in the first and second embodiments, the tensile-force-ratio adjustment mechanisms 140 and 240 include the upstream-direction tensile rolls 130 and 230, respectively, and thus it is possible to increase the upstream active material absent portion tensile force τu which is applied to the inter-roll active material absent portion 12Zb of the active material absent portion 12Z. In this manner, only by a simple configuration of providing the upstream-direction tensile rolls 130 and 230, the tensile force ratio τd/τu can be made small and the imbalance between the tensile forces τd and τu can be made small.

On the other hand, in the third and fourth embodiments, the tensile-force-ratio adjustment mechanisms 340 and 440 include the upstream-direction tensile rolls 330 and 340, respectively, and thus it is possible to reduce the downstream active material absent portion tensile force τd which is applied to the inter-roll active material absent portions 12Zb of the active material absent portions 12Z. In this manner, only by a simple configuration of providing the upstream-direction tensile rolls 330 and 430, the tensile force ratio τd/τu can be made small and the imbalance between the tensile forces τd and τu can be made small.

Further, in the fifth embodiment, the tensile-force-ratio adjustment mechanism 540 includes the downstream-side driving roll 530, and thus the downstream active material absent portion tensile force τd which is applied to the inter-roll active material absent portions 12Zb of the active material absent portions 12Z can be reduced. In this manner, only by a simple configuration of providing the downstream-side driving roll 530, the tensile force ratio τd/τu can be made small and the imbalance between the tensile forces τd and τu can be made small.

In the manufacturing method for the compressed strip-shaped electrode plate 1 of the embodiments 1 to 5, in the pressing step S2, the balance of the tensile force applied to the inter-roll active material absent portions 12Zb of the active material absent portions 12Z of the strip-shaped electrode plate 1Z is adjusted, more specifically, the tensile force ratio τd/τu of the upstream active material absent portion tensile force τu and the downstream active material absent portion tensile force τd which are applied to the inter-roll active material absent portions 12Zb is adjusted to manufacture the compressed strip-shaped electrode plate 1 with restraining generation of the wrinkles on the active material absent portions 12Z (the post-pressed active material absent portions 12). Accordingly, the compressed strip-shaped electrode plate 1 restrained with generation of the wrinkles can be further appropriately obtained. Especially, the tensile force ratio is set as τd/τu≤2 so that the compressed strip-shaped electrode plate 1 in which generation of the wrinkles is restrained can be appropriately obtained by further restraining generation of the wrinkles on the active material absent portions 12Z (the post-pressed active material absent portions 12). Furthermore, the tensile force ratio is set as τd/τu≥0.3, and thus the productivity of the compressed strip-shaped electrode plate 1 can be made preferable.

The present disclosure has been explained in the first to fifth embodiments mentioned above, but the present disclosure is not limited to the first to fifth embodiments and may naturally be applied with modifications in an appropriate manner without departing from the scope of the disclosure.

For example, the first to fifth embodiments apply the present disclosure in a case that the compressed strip-shaped electrode plate 1 is a positive electrode plate, but alternatively, the present disclosure may be applied to another case that the compressed strip-shaped electrode plate 1 is a negative electrode plate.

REFERENCE SIGNS LIST

1 Compacted strip-shaped electrode plate
1Z Strip-shaped electrode plate (which is before being pressed)
3 Current collecting foil
5 First compressed active material layer
5Z First active material layer (which is before being pressed)
6 Second compressed active material layer
6Z Second active material layer (which is before being pressed)
11 Post-pressed active material portion
11r, 11s Tensile roll pressure portion (of the post-pressed active material portion)
11t Roller pressure portion
11Z Active material portion (which is before being pressed)
11Za Pre-press active material portion
11Zb Inter-roll active material portion
12 Post-pressed active material absent portion
12Z Non-active material portion (which is before being pressed
12Za Pre-press active material absent portion
12Zap, 12Zaq Tensile roll pressure portion (of the pre-press active material absent portion)
12Zb Inter-roll active material absent portion
100, 200, 300, 400, 500 Roll press apparatus
110 First press roll
120 Second press roll
130, 230, 330, 430 Upstream-direction tensile roll
530 Downstream-side driving roll (downstream-direction tensile roll)
140, 240, 340, 440, 540 Tensile-force-ratio adjustment mechanism
EH Longitudinal direction
EUH Upstream side
EDH Downstream side
FH Width direction
GH Thickness direction
KA Roller gap
Tu Upstream entire tensile force
Td Downstream entire tensile force
Tu1, Tu2, Tu2', Td1, Td2, Td2', Tp, Tq, Tr, Ts Tensile force
τu Upstream active material absent portion tensile force
τd Downstream active material absent portion tensile force
S1 Electrode plate forming step
S2 Pressing step

What is claimed is:

1. A roll press apparatus configured to form a compressed strip-shaped electrode plate formed with a compressed active material layer, which is formed in a manner that a strip-shaped electrode plate is conveyed in a longitudinal direction to be roll-pressed so that an active material layer is compressed, the strip-shaped electrode plate comprising:
an active material portion including a strip-shaped current collecting foil and the active material layer of a strip shape extending over the current collecting foil in the longitudinal direction of the current collecting foil, the active material portion of a strip shape extending in the longitudinal direction and including the active material layer in a thickness direction of the current collecting foil, and
an active material absent portion of a strip shape extending in the longitudinal direction and being arranged on a side of the active material portion in a width direction of the current collecting foil, the active material absent portion having no active material layer in the thickness direction and having a smaller thickness than the active material portion, wherein the roll press apparatus includes:
- a pair of press rolls placed in parallel with a roll gap formed therebetween; and
- a tensile-force-ratio adjustment mechanism configured to adjust a tensile force ratio τd/τu of an upstream active material absent portion tensile force τu and a downstream active material absent portion tensile force τd to be within a range greater than or equal to 0.3 and less than or equal to 2.0, wherein the tensile-force-ratio adjustment mechanism includes one or more of an upstream-direction tensile roll or a downstream-direction tensile roll, in an inter-roll active material absent portion held with no compression by the pair of press rolls of the active material absent portion of the strip-shaped electrode plate.

2. The roll press apparatus according to claim 1, wherein the tensile-force-ratio adjustment mechanism includes the upstream-direction tensile roll, the upstream-direction tensile roll being configured to push a pre-press active material absent portion before roll-pressing of the active material absent portion of the strip-shaped electrode plate against any one of the pair of press rolls and pull the pre-press active material absent portion toward an upstream side to increase the upstream active material absent portion tensile force that is applied to the inter-roll active material absent portion.

3. The roll press apparatus according to claim 1, wherein the tensile-force-ratio adjustment mechanism includes the upstream-direction tensile roll, the upstream-direction tensile roll being configured to push a post-pressed active material portion of the compressed strip-shaped electrode plate after roll-pressing against any one of the pair of press rolls and pull the post-pressed active material portion toward the upstream side to reduce the downstream active material absent portion tensile force that is applied to the inter-roll active material absent portion.

4. The roll press apparatus according to claim 1, wherein the tensile-force-ratio adjustment mechanism includes the downstream-direction tensile roll, the downstream-direction tensile roll being configured to push a post-pressed active material portion of the compressed strip-shaped electrode plate after roll-pressing against any one of the pair of press rolls and pull the post-pressed active material portion toward a downstream side to reduce the downstream active material absent portion tensile force that is applied to the inter-roll active material absent portion.

5. The roll press apparatus according to claim 2, wherein the tensile-force-ratio adjustment mechanism includes the upstream-direction tensile roll, the upstream-direction tensile roll being configured to push the post-pressed active material portion of the compressed strip-shaped electrode plate after roll-pressing against any one of the pair of press rolls and pull the post-pressed active material portion toward the upstream side to reduce the downstream active material absent portion tensile force that is applied to the inter-roll active material absent portion.

6. The roll press apparatus according to claim 2, wherein the tensile-force-ratio adjustment mechanism includes the downstream-direction tensile roll, the downstream-direction tensile roll being configured to push the post-pressed active material portion of the compressed strip-shaped electrode plate after roll-pressing against any one of the pair of press rolls and pull the post-pressed active material portion toward a downstream side to reduce the downstream active material absent portion tensile force that is applied to the inter-roll active material absent portion.

\* \* \* \* \*